(12) United States Patent
Won

(10) Patent No.: US 11,960,860 B2
(45) Date of Patent: Apr. 16, 2024

(54) WORKFLOW FOR COMPUTER GAME DEVELOPMENT

(71) Applicant: Abstract Software, Inc., Seattle, WA (US)

(72) Inventor: JongSeok Won, Kirkland, WA (US)

(73) Assignee: Abstract Software, Inc., Seattle, WA (US)

( * ) Notice: Subject to any disclaimer, the term of this patent is extended or adjusted under 35 U.S.C. 154(b) by 135 days.

(21) Appl. No.: 17/829,150

(22) Filed: May 31, 2022

(65) Prior Publication Data

US 2023/0214191 A1 Jul. 6, 2023

Related U.S. Application Data

(60) Provisional application No. 63/297,206, filed on Jan. 6, 2022.

(51) Int. Cl.
*G06F 8/20* (2018.01)
*G06F 8/30* (2018.01)
(52) U.S. Cl.
CPC ............... *G06F 8/20* (2013.01); *G06F 8/30* (2013.01)
(58) Field of Classification Search
CPC .................................. G06F 8/30; G06F 8/20
See application file for complete search history.

(56) References Cited

U.S. PATENT DOCUMENTS

| | | | | |
|---|---|---|---|---|
| 5,760,788 A | * | 6/1998 | Chainini | G09B 19/0053 715/835 |
| 2011/0173587 A1 | * | 7/2011 | Detwiller | A63F 13/92 717/109 |
| 2022/0075602 A1 | * | 3/2022 | Kogelman | G06F 8/33 |
| 2022/0126208 A1 | * | 4/2022 | Salakka | A63F 13/67 |

OTHER PUBLICATIONS

Guo, Hong, "A Workflow for Model Driven Game Development," 2015 IEEE 19th International Enterprise Distributed Object Computing Conference, IEEE Computer Society, 11 pages.

(Continued)

*Primary Examiner* — Phillip H Nguyen
(74) *Attorney, Agent, or Firm* — Lowe Graham Jones PLLC; Ellen M. Bierman

(57) ABSTRACT

Methods, systems, and techniques for enhanced game development workflow between programmers and non-programmers are provided. Example embodiments provide an EGPIDE which provides an environment suitable for workflow collaboration for software programmers or those game developers that prefer to work in textual language versus non-programmer game designers that prefer to work in visual language. In one embodiment, the EGPIDE comprises an EGPIDE script programming parser and visualization engine, an EGPIDE node graph visual programming parser and visualization engine, EGPIDE translation management, EGPIDE autolayout support, and user interface support. These components provide automatic translation between visual programming specification and text based programming specification to enable real time bi-directional communication between these types of programming to expedite game development process.

20 Claims, 45 Drawing Sheets

(56) References Cited

OTHER PUBLICATIONS

Behavior Tree Node Reference—Unreal Engine Documentation, download date Dec. 25, 2021, https://docs.unrealengine.com/4.27/en-US/InteractiveExperiences/ArtificialIntelligence/BehaviorTreeNodeReference/ 2 pages.

Behavior Tree Overview—Unreal Engine Documentation, download date Dec. 24, 2021, https://docs.unrealengine.com/4.27/en-US/InteractiveExperiences/ArtificialIntelligence/BehaviorTrees/BehaviorTreeOverview/ 5 pages.

Behavior Tree Quick Start Guide—Unreal Engine Documentation, download date Dec. 24, 2021, https://docs.unrealengine.com/4.27/en-US/InteractiveExperiences/ArtificialIntelligence/BehaviorTrees/BehaviorTreeQuikStart/ 9 pages.

Behavior Tree User Guide—Unreal Engine Documentation, download date Dec. 24, 2021, https://docs.unrealengine.com/4.27/en-US/InteractiveExperiences/ArtificialIntelligence/BehaviorTrees/BehaviorTreeUserGuide/ 5 pages.

NodeNetwork—NodeNetwork is a node editor component library for C# WPF Using ReactiveUI, download date Dec. 25, 2021, wouterdek.me/NodeNetwork/example_projects, 2 pages.

NodeNetwork—NodeNetwork is a node editor component library for C# WPF Using ReactiveUI, download date Dec. 25, 2021, wouterdek.me/NodeNetwork/components, 2 pages.

\* cited by examiner

```
                                                          600
#Test1                                                   ↙
    Test1.sln
    #Source
        Test1.vcxproj
        <other C++ files outside of AbstractAccessible>
    #AbstractAccessible
        AbstractAccessible.vcxproj
        CyActorState.cpp
        CyActorState.h
        CyActorStateManager.cpp
        CyActorStateManager.h
        <other AbstractAccessible C++ files>
    #Content
        #Test0ABS
            Test0ABS.absproj
            #Source
                .abscache
                CAS_DefaultPlayer.absc
                CAS_DefaultPlayer.absng
                <other absc/absng files>
            #Export
                #Debug
                    #x64
                        <older version Source dlls>
                        Source-143.dll
                        Test.abex
            <other content files like art assets>
```

*Fig. 6A*

```
pragma once include <AbstractSDK.h>
include "ValueTypeDefinitions.h"
#include "CyActorState.h"

struct CyActorStateChangeRequest
{
    String definitionName;
};

class ABSTRACT_SDK_EXPORT CyActorStateManager
{
public:
    CyActorStateManager();

void SetSourceLib(const AbstractSDK::AbsLibrary& sourceLib);

void FlushRequests();
    void RequestStateChange(String definitionName);

CyActorState& GetCurrentState();
    void UpdateCurrentState(CyActorStateUpdateInput& input, CyActorStateUpdateOutput& output);

void Reset();

String GetCurrentStateDefinitionName() const;

Boolean GetCurrentStateBlackboardBoolean(AbstractSDK::AbsStringParam label) const;
    Integer GetCurrentStateBlackboardInteger(AbstractSDK::AbsStringParam label) const;
    Number  GetCurrentStateBlackboardNumber(AbstractSDK::AbsStringParam label) const;
    Vector  GetCurrentStateBlackboardVector(AbstractSDK::AbsStringParam label) const;
    void SetCurrentStateBlackboardBoolean(AbstractSDK::AbsStringParam label, Boolean val);
    void SetCurrentStateBlackboardInteger(AbstractSDK::AbsStringParam label, Integer val);
    void SetCurrentStateBlackboardNumber(AbstractSDK::AbsStringParam label, Number val);
    void SetCurrentStateBlackboardVector(AbstractSDK::AbsStringParam label, Vector val);

private:
    const AbstractSDK::AbsLibrary* m_sourceLib;

String m_currentStateDefinitionName;
    CyActorState m_currentState;

CyActorStateChangeRequest* m_pendingRequest;
};

ABSTRACT_SDK_VALUE_TYPE_DEFINITION(ACyActorStateManager, CyActorStateManager*);

ABSTRACT_SDK_NODE_DEFINITION() Execution CAS_RequestStateChange(ACyActorStateManager stateManager, String cyActorStateDefinitionName);
```

```cpp
pragma once include <AbstractSDK.h>
include "ValueTypeDefinitions.h"                                    620 class CyActorStateManager;
ABSTRACT_SDK_VALUE_TYPE_DECLARE(ACyActorStateManager, CyActorStateManager*);

struct CyActorStateUpdateInput
{
    Number deltaTime;
    Vector velocity;
    Vector facing;
    Vector desiredFacing;
    Vector desiredVelocity;
};

struct CyActorStateUpdateOutput
{
    Vector velocity;
    Vector facing;
    String outputMessage;
};

ABSTRACT_SDK_VALUE_TYPE_DEFINITION(ACyActorStateUpdateInput, CyActorStateUpdateInput*);
ABSTRACT_SDK_VALUE_TYPE_DEFINITION(ACyActorStateUpdateOutput, CyActorStateUpdateOutput*);

ABSTRACT_SDK_NODE_DEFINITION() Number CAS_UpdateInput_GetDeltaTime(ACyActorStateUpdateInput input);
ABSTRACT_SDK_NODE_DEFINITION() Vector CAS_UpdateInput_GetVelocity(ACyActorStateUpdateInput input);
ABSTRACT_SDK_NODE_DEFINITION() Vector CAS_UpdateInput_GetFacing(ACyActorStateUpdateInput input);
ABSTRACT_SDK_NODE_DEFINITION() Vector CAS_UpdateInput_GetDesiredFacing(ACyActorStateUpdateInput input);
ABSTRACT_SDK_NODE_DEFINITION() Vector CAS_UpdateInput_GetDesiredVelocity(ACyActorStateUpdateInput input);

ABSTRACT_SDK_NODE_DEFINITION() Execution CAS_UpdateOutput_SetVelocity(ACyActorStateUpdateOutput output, Vector newVelocity);
ABSTRACT_SDK_NODE_DEFINITION() Execution CAS_UpdateOutput_SetFacing(ACyActorStateUpdateOutput output, Vector newFacing);
ABSTRACT_SDK_NODE_DEFINITION() Execution CAS_UpdateOutput_SetOutputMessage(ACyActorStateUpdateOutput output, String message);

ABSTRACT_SDK_CLASS_DECLARATION(CyActorState)
{
public:
    ABSTRACT_SDK_CLASS_LABEL("CyActorState");

void LoadDefinition(const AbstractSDK::AbsLibrary & sourceLib, AbstractSDK::AbsStringParam   621a
    definitionName);
    ┌─────────────────────────────────────────────────────────────────────────┐
    │   ABSTRACT_SDK_EVENT_DECLARATION("On Enter")                            │
    │   Execution OnEnter();                                                  │
    │                                                                         │
    │   ABSTRACT_SDK_EVENT_DECLARATION("On Update")                           │
    │   Execution Update();                                                   │
    │                                                                         │
    │   ABSTRACT_SDK_DATA_BINDING("Parent Manager")                           │
    │   ACyActorStateManager m_manager;                                       │
    │                                                                         │
    │   ABSTRACT_SDK_DATA_BINDING("Update Input")                             │
    │   ACyActorStateUpdateInput m_updateInput;                               │
    │                                                                         │
    │   ABSTRACT_SDK_DATA_BINDING("Update Output")                            │
    │   ACyActorStateUpdateOutput m_updateOutput;                             │
    │                                                                         │
    │   ABSTRACT_SDK_DATA_BINDING("Skeleton Mesh Component")                  │
    │   UESkeletonMeshComponent m_skeletonMeshComponent;                      │
    └─────────────────────────────────────────────────────────────────────────┘
```

```
    ABSTRACT_SDK_DATA_BINDING("Parent Manager (Class)")
    ABSClass m_parentManager;

ABSTRACT_SDK_DATA_BINDING("Parent Controller (Class)")
    ABSClass m_parentController;

ABSTRACT_SDK_DATA_BINDING("Status Manager (Class)")
    ABSClass m_statusManager;
};
```

*Fig. 6D*

```
Event[Name:"On Update"]
{
    if (NumberGreaterThan(
        VectorMagnitude(
            CAS_UpdateInput_GetDesiredVelocity(
                ClassData[Name:"Update Input"]())),
        80.0))
    {
        CAS_UpdateOutput_SetFacing(
            ClassData[Name:"Update Output"](),
            BBEntry[Type:Vector, Name:"Last_facing"](self));
    }
    else
    {
        CAS_UpdateOutput_SetFacing(
            ClassData[Name:"Update Output"](),
            CAS_UpdateInput_GetDesiredVelocity(
                ClassData[Name:"Update Input"]()));
        BBEntry[Type:Vector, Name:"Last_facing"](self) =
            CAS_UpdateInput_GetFacing(
                ClassData[Name:"Update Input"]());
    }
}
```

*Hey this isn't doing anything. Can you help me figure this out? I'm trying to lock the facing vector when the speed falls below 80.*

Fig. 6L

*Oh looks like you used the wrong node. You are using NumberGreaterThan. What you want here is NumberLessThan. Here try this instead:*

```
Event[Name:"On Update"]
{
    if (NumberLessThan(
        VectorMagnitude(
            CAS_UpdateInput_GetDesiredVelocity(
                ClassData[Name:"Update Input"]())),
        80.0))
    {
        CAS_UpdateOutput_SetFacing(
            ClassData[Name:"Update Output"](),
            BBEntry[Type:Vector, Name:"last_facing"](self));
    }
    else
    {
        CAS_UpdateOutput_SetFacing(
            ClassData[Name:"Update Output"](),
            CAS_UpdateInput_GetDesiredVelocity(
                ClassData[Name:"Update Input"]()));
        BBEntry[Type:Vector, Name:"last_facing"](self) =
            CAS_UpdateInput_GetFacing(
                ClassData[Name:"Update Input"]());
    }
}
```

Fig. 6M

```
ABSTRACT_SDK_CLASS_DECLARATION(CyPlayerController)                    615
{
public:
    ABSTRACT_SDK_CLASS_LABEL("CyPlayerController");

void LoadDefinition(const AbstractSDK::AbsLibrary & sourceLib,
AbstractSDK::AbsStringParam definitionName);
                                                              617
    ABSTRACT_SDK_EVENT_DECLARATION("On Update")
    Execution Update();                                              616
```
```
    ABSTRACT_SDK_DATA_BINDING("Camera Look Direction")
    Vector m_cameraLookDirection;

ABSTRACT_SDK_DATA_BINDING("Player Movement Input")
    Vector m_movementInput;

ABSTRACT_SDK_DATA_BINDING("Desired Velocity")
    Vector m_desiredVelocity;

ABSTRACT_SDK_DATA_BINDING("Desired Facing")
    Vector m_desiredFacing;

ABSTRACT_SDK_DATA_BINDING("Delta Time")
    Number m_deltaTime;

ABSTRACT_SDK_DATA_BINDING("A Button")
    Boolean m_aButton;

ABSTRACT_SDK_DATA_BINDING("B Button")
    Boolean m_bButton;

ABSTRACT_SDK_DATA_BINDING("X Button")
    Boolean m_xButton;

ABSTRACT_SDK_DATA_BINDING("Y Button")
    Boolean m_yButton;

ABSTRACT_SDK_DATA_BINDING("Puppet Actor Current State (Class)")
    ABSClass m_puppetActorCurrentState;
```
```
};
```

Fig. 6Q

Example AbstractScript Grammar

```
raw_string = '"' <ANY NOT '"'>* '"'                                    1200 letter = [a-z] | [A-Z]
digit = [0-9]
nonZeroDigit = [1-9]

integer = ?('-') nonZeroDigit digit* | '0'
number = ?('-') digit* '.' digit* boolean = "true" | "false"

NULL = "null"

primitive_expression = null | boolean | raw_string | number | integer identifier = letter identifier_char*
identifier_char = letter | digit | '_' space = [ \t\n]+
optional_space = [ \t\n]* expression = primitive_expression | function_call | identifier function_call_param_unit = optional_space expression optional_space
function_call_param_entry = ',' function_call_param_unit
function_call_param_entries = function_call_param_unit
function_call_param_entry* function_call = identifier optional_space '('
(function_call_param_entries | optional_space) ')' statement = (function_call optional_space ';' | if_code_group)

property = identifier optional_space ':' optional_space (identifier |
raw_string | property | property_list)

property_list_begin = '{'
property_list_end = '}'
property_list = property_list_begin optional_space ?(property_group
(optional_space ',' optional_space property_group)* optional_space)
property_list_end
```

*Fig. 12A*

```
property_group_begin = '['
property_group_end = ']'
property_group = property_group_begin optional_space ?(property
(optional_space ',' optional_space property)* optional_space)
property_group_end binding_declaration = identifier optional_space property_group
binding_code_group = binding_declaration optional_space scoped_code_group if_condition = "if" optional_space '(' optional_space expression
optional_space ')'
else = "else" ((space if_code_group) | (optional_space scoped_code_group))
if_code_group = if_condition optional_space scoped_code_group
?(optional_space else)

code_group = binding_code_group | statement
scoped_code_group = '{' optional_space (code_group optional_space)* '}' translation_unit = optional_space (code_group optional_space)*
```

*Fig. 12B*

Example AbstractScript script language for StickIndicator Example

```
Class[
    ClassType:"CyActorState",
    Blackboard:{
        [Type:Vector, Name:"last_facing"]
    }]
{
    Event[Name:"On Enter"]
    {
        CAS_UpdateOutput_SetFacing(
            ClassDataGet("Update Output"),
            VectorNormalize(
                CreateVector(
                    1.0,
                    1.0,
                    0.0)));
    }

Event[Name:"On Update"]
    {
        if (NumberLessThan(
            VectorMagnitude(
                CAS_UpdateInput_GetDesiredVelocity(
                    ClassDataGet("Update Input"))),
            80.0))
        {
            CAS_UpdateOutput_SetFacing(
                ClassDataGet("Update Output"),
                BlackboardGet(
                    self,
                    Vector,
                    "last_facing"));
        }
        else
        {
            CAS_UpdateOutput_SetFacing(
                ClassDataGet("Update Output"),
                CAS_UpdateInput_GetDesiredVelocity(
                    ClassDataGet("Update Input")));
            BlackboardSet(
                self,
                CAS_UpdateInput_GetFacing(
                    ClassDataGet("Update Input"),
                Vector,
                "last_facing");
        }
    }
}
```

Abstract Syntax Tree for StickIndicator Example

```
ClassBinding
{
    ClassType = "CyActorState",
    BlackboardEntries = [
        BlackboardEntry {
            Type = Vector,
            Name = "last_facing"
        }
    ], ChildrenBindings = [
        EventBinding {
            Name = "On Update",
            ChildrenBindings = [],
            ChildrenStatements = [
                FunctionCall {
                    Identifier = "CAS_UpdateOutput_SetFacing",
                    Params = [
                        FunctionCall {
                            Identifier = "ClassDataGet",
                            Params = [
                                "Update Output"
                            ]
                        },
                        FunctionCall {
                            Identifier = "VectorNormalize",
                            Params = [
                                FunctionCall {
                                    Identifier = "CreateVector",
                                    Params = [
                                        1.0,
                                        1.0,
                                        0.0
                                    ]
                                }
                            ]
                        }
                    ]
                }
            ]
        }
    ]
}
```

*Fig. 14A*

```
EventBinding {
        Name = "On Update",
        ChildrenBindings = [],
        ChildrenStatements = [
            IfElseStatement {
                ConditionExpression =
                    FunctionCall {
                        Identifier = "NumberLessThan",
                        Params = [
                            FunctionCall {
                                Identifier = "VectorMagnitude",
                                Params = [
                                    FunctionCall {
                                        Identifier =
"CAS_UpdateInput_GetDesiredVelocity",
                                        Params = [
                                            FunctionCall {
                                                Identifier =
"ClassDataGet",
                                                Params = [
                                                    "Update Input"
                                                ]
                                            }
                                        ]
                                    }
                                ]
                            },
                            80.0
                        ]
                    },
                OnTrueStatements = [
                    FunctionCall {
                        Identifier = "CAS_UpdateOutput_SetFacing",
                        Params = [
                            FunctionCall {
                                Identifier = "ClassDataGet",
                                Params = [
                                    "Update Output"
                                ]
                            },
                            FunctionCall {
                                Identifier = "BlackboardGet",
```

Fig. 14B

```
Params = [
                                            Self,
                                            Type.Vector,
                                            "last_facing"
                                        ]
                                    }
                                ]
                            }
                        ]
                    },
                    OnFalseStatements = [
                        FunctionCall {
                            Identifier = "CAS_UpdateOutput_SetFacing",
                            Params = [
                                FunctionCall {
                                    Identifier = "ClassDataGet",
                                    Params = [
                                        "Update Output"
                                    ]
                                },
                                FunctionCall {
                                    Identifier =
"CAS_UpdateInput_GetDesiredVelocity",
                                    Params = [
                                        FunctionCall {
                                            Identifier = "ClassDataGet",
                                            Params = [
                                                "Update Input"
                                            ]
                                        }
                                    ]
                                }
                            ]
                        },
                        FunctionCall {
                            Identifier = "BlackboardSet",
                            Params = [
                                Self,
                                FunctionCall {
                                    Identifier =
"CAS_UpdateInput_GetFacing",
                                    Params = [
                                        FunctionCall {
                                            Identifier = "ClassDataGet",
```

*Fig. 14C*

```
Params = [
                                                            "Update Input"
                                                        ]
                                                    }
                                                ]
                                            },
                                            Type.Vector,
                                            "last_facing"
                                        ]
                                    }
                                ]
                            }
                        ]
                    }
                ],
    ChildrenStatements = []
}
```

*Fig. 14D*

WORKFLOW FOR COMPUTER GAME DEVELOPMENT

CROSS-REFERENCE TO RELATED APPLICATIONS

This application claims the benefit of U.S. Provisional Patent Application No. 63/297,206, entitled "IMPROVED WORKFLOW FOR COMPUTER GAME DEVELOPMENT," filed Jan. 6, 2022, which application is incorporated herein by reference in its entirety.

TECHNICAL FIELD

The present disclosure relates to methods, techniques, and systems for improving workflow in electronic game development and, in particular, to methods, techniques, and systems for enabling non-programmer game designers to work visually in conjunction with programmer game developers that work in a programming language or scripting language.

BACKGROUND

Development in the electronic (computer, video, specialty hardware, etc.) game industry, includes the input and output of many different sorts of folks with myriad skills, including directors, graphic designers, software programmers (gameplay engineers) and the like at various phases in the game development process. In the game industry, C++ is the dominant programming language due to its performance and amount of control access to underlying hardware. Unfortunately, C++ is a difficult language to learn for many people involved in the creation of video games such as designers that are not traditional software programmers. This difficulty has forced the industry to adopt a workflow that involves design documents, nativization to C++ to optimize code generated from other more approachable scripting languages, and expensive iterative processes, for example between (software programmer) gameplay engineers and non-programmer game designers. In addition, game engines have been developed (such as the UNREAL ENGINE by Epic Games, available at "https://www.unrealengine.com" that attempts to aid these processes by offering visual interfaces to non-programmer game designers, and the separate ability to run traditional software code produced by the game software developers. Artists, illustrators, and game designers can work primarily in the Unreal user interface to define graphics, and blueprints—which produce objects/characters with behaviors in the games. These graphical objects are then iteratively reviewed and tweaked as all participants converge on a game design.

There is still an arduous process to produce a commercial quality game because of the iteration involved. This is particularly true where the game has advanced features such as games that support artificial intelligence ("AI") characters, such as objects/entities that exhibit behaviors in response to triggers, the game environment, and/or other input to act seemingly on their own. To do this, the AI character must be assigned behaviors responsive to things such as time, (simulated) visual perception, triggers, and other inputs. Typically, the game engineer (software developer) defines a behavior tree (set of choices and decisions to be performed by the AI character) that is executed by the character. The game engineer might enable certain aspects of the behaviors such as the triggers, attributes of the triggers, attributes of the results to be definable by the non-programmer game designers (NPGD) who are responsible for "game flow." Nonetheless, in order for the game engineer to properly implement that behavior tree, the game designer needs to communicate to the engineer coherent specifications and designs such as "hidden enemy character 'M' when it "sees" the player in its visual perception area—runs after it and chases it; when it doesn't see it, it transports to another location and waits there until it sees a player." Although this is a rudimentary example, one can imagine much greater complexities available.

Thus, in a traditional game development environment, a game development workflow may typically involve:

1. The gameplay engineer (software programmer) implements a behavior tree system that can support complex set of behaviors for AI ("artificial intelligence") characters, including specifying inputs from the environment and other triggers, parameters used to set attributes of the character, and the like;
2. Game designers write design documents for specific behaviors such as those described above;
3. The gameplay engineer attempts to interpret the design document and implements the behaviors in C++ (or other scripting languages which need nativization to C++);
4. Designers preview the AI character in "action" and provide feedback;
5. The gameplay engineer adjusts the C++ code based on the feedback;
6. Steps 4 and 5 are repeated until everyone is satisfied.

Once the design has been nailed down, the gameplay engineer polishes the implementation, including possible nativizations required for the implementation to be performant. This basic process is slow and omits benefits that may be realized from more joint collaboration when people work together at the same time or in a shared environment.

BRIEF DESCRIPTION OF THE DRAWINGS

FIGS. 12A-12B are an example AbstractScript scripting language grammar.

FIG. 13 is an example script for an entity in an example Enhanced Game Play Interactive Development Environment.

FIGS. 14A-14D is an example intermediate data structure used by example automatic translations in an example Enhanced Game Play Interactive Development Environment.

DETAILED DESCRIPTION

Figure 1:
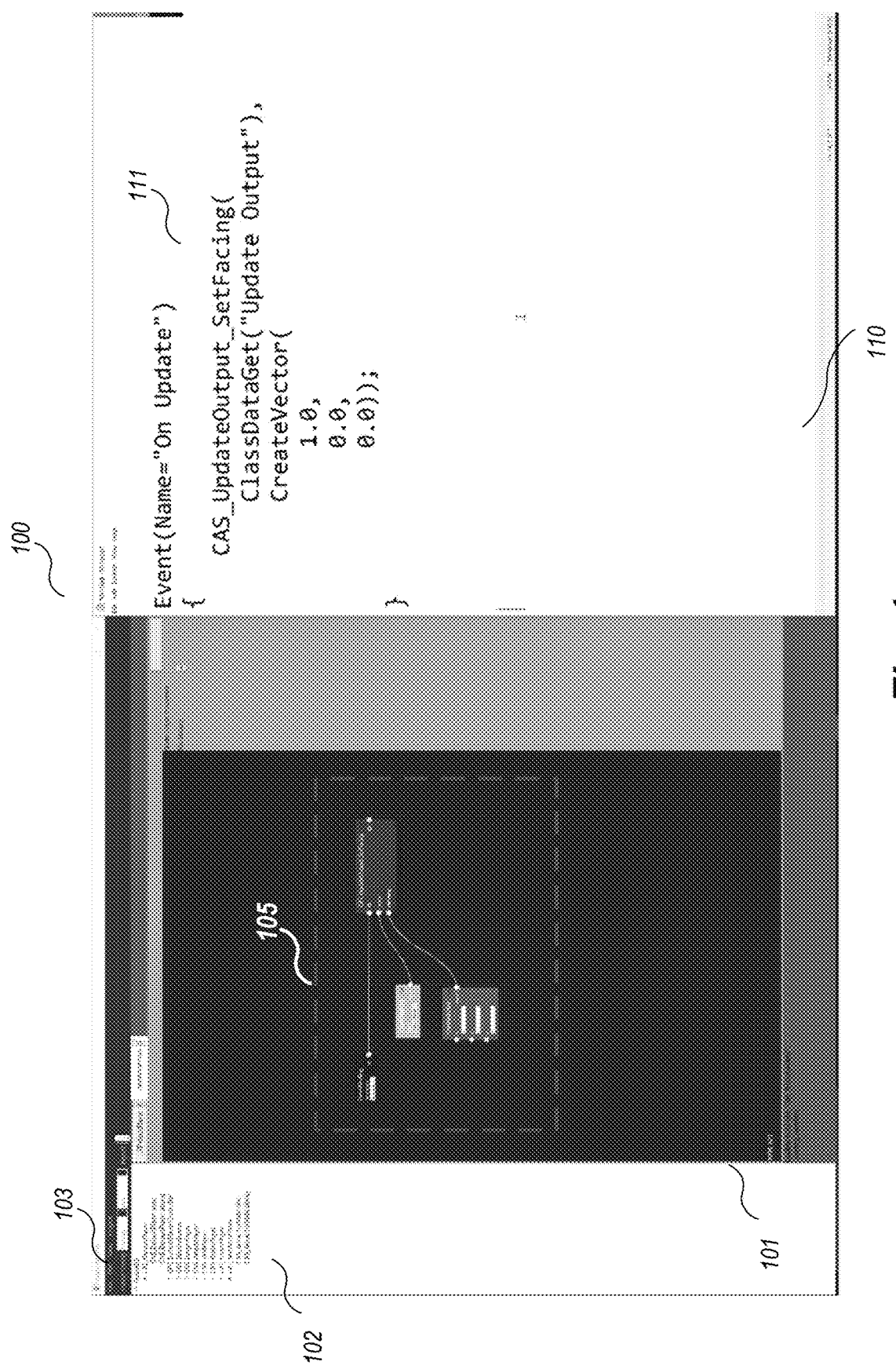
FIG. 1 is an example screen display of an example Enhanced Game Play Interactive Development Environment featuring enhanced workflow between visual programming and textual programming.

Embodiments described herein provide enhanced computer- and network-based methods, techniques, and systems for game development workflow between programmers and non-programmers. Example embodiments provide an Enhanced Game Play Interactive Development Environment ("EGPIDE") which provides an environment suitable for workflow collaboration for software programmers or those game developers that prefer to work in "textual" language versus non-programmer game designers that prefer to work in visual language. For ease of discussion, the software programmers or game developers that prefer to work in text will be referred to as "software programmers" and the non-programmer game designers will be referred to as "game designers." It is understood that some individuals may be able to operate as both and this designation is meant to refer to preference of work style.

The EGPIDE offers each user the ability to work in their preferred language visually or textual, and the EGPIDE automatically translates between the two forms—so that each can effectively communicate in near real time without the overhead and longer iterative process of traditional game development. In particular, the EGPIDE enables the software programmer the ability to work primarily in a traditional text-based programming language, such as C++, or a (textual) scripting language that is easily parsed and compiled into a traditional programming language. Similarly, the EGPIDE enables the game designer to working primarily using a visual programming language, for example to specify game flow logic or other attributes, actions, states, etc. Many existing visual programming languages exist—the essence of which offer a user the ability to use direct manipulation (drag and drop) to place objects in a workspace, link them, and specify their inputs and outputs. In addition, the EGPIDE enables the combination of the visual/text programming to be automatically integrated into the C++ (or other) native language of the game so that later nativization is not required.

Using the text based programming language capabilities in EGPIDE (both a text-based programming language and a scripting language are referred to herein as textual programming languages), the software programmer can, for example, define the behavior trees in game development used to give characters (which may be entities, players, other objects, and the like) "artificial intelligence"—that is, the appearance of behavior in the game based upon its own volition. Meanwhile, using a visual programming language in the form of EGPIDE node graphs, the game designer can define game flow logic (states, attributes, actions, and the like) for various game characters (here referred to as "actors"). The EGPIDE provides improvements over other game development environments in that using its own node graph language and own scripting language it allows direct and automatic translation back and forth between the visual language (node graphs) and compilable-to-executable textual programming language so that the software programmer and game designer can communicate each in their own language and be understood by the other in nearly real-time conversation. Here we refer to "nearly real-time" or "real time" in the sense that, similar to an application that uses a phone call, chat or message system to communicate in a bi-directional communication, the software programmer and game designer can effect a conversation that feels like it is being conducted simultaneously (i.e., in real time), when desired. (The EGPIDE also supports the ability to have delayed conversations such as those that behave more like email conversations, where the recipient can choose when to respond to the sender.)

These enhancements to game development workflow are accomplished by providing an interactive development environment ("IDE") that uses an enhanced node graph syntax to provide a visual programming environment and a scripting syntax to provide a textual programming environment. (Although the EGPIDE has defined its own scripting language, it is possible to similarly incorporate other scripting languages as long as the syntax is known.) When the game designer wants to communicate an aspect of the game logic to the software programmer, the designer transfers, e.g., copies and pastes (e.g., using copy/paste, keyboard commands like control-C/control-V, or using a pointer input device and direct manipulation commands, or the like) the portion of the node graph they wish to communicate into a message window or other window that supports textual input and output), and the IDE automatically translates the transferred portion into text—e.g., scripting language. In one example EGPIDE this is accomplished using a shared operating system resource such as the system "clipboard." One reason to engage in such real time conversation may be, for example, to correct logic that the game designer hasn't been able to make work. Similarly, when the software programmer wishes to communicate an aspect of the game logic to the game designer, the software programmer transfers, e.g., copies and pastes (e.g., using copy/paste, keyboard commands like control-C/control-V, or using a pointer input device and direct manipulation commands, or the like) the portion of the textual programming language they wish to communicate into the node graph presentation window of the IDE, and the IDE automatically translates the transferred portion into a node graph. This process can happen as fast as almost instantaneously such that an true bi-directional conversation can occur with the typical delays of traditional game development iteration.

FIG. 1 is an example screen display of an example Enhanced Game Play Interactive Development Environment featuring enhanced workflow between visual programming and textual programming. An example use scenario that utilizes this enhanced workflow is described below with respect to an example EGPIDE called the "AbstractIDE." In FIG. 1, the EGPIDE user interface ("UI") 100 comprises a menu area 103, a project list area 102, a node graph/scripting display area 101 and (optionally) a textual message area 110. In some EGPIDE user interface 100, the message area 110 is integrated into the UI 100. In other EGPIDE interfaces 100, the message area 110 is provided by a separate application such as a word processing document, messaging application, chat window, or the like, and the EGPIDE translates between the node graph/scripting display area 101 and the textual message area 110 uses a shared resource for copy/paste (or other transfer mechanism) such as a clipboard implemented by the underlying operating system or window system. The node graph/scripting area 101 is shown currently displaying a node graph 105. In some EGPIDE examples, each type of node may be represented by its own color for easy user recognition. In some EGPIDE examples, the node graph visual programming language and/or the scripting language is provided by the EGPIDE and thus unique to that EGPIDE. In other EGPIDE examples, the visual programming and/or the scripting language is a third party language whose syntax is known or discoverable. As long as the language can be parsed and translated, it is usable to the EGPIDE. In some example EGPIDEs each language is translated into an intermediate form such as an abstract syntax tree for easier conversion. In the example shown, the message area 110 is currently displaying EGPIDE scripting language 111 that corresponds to the node graph 105 shown in node graph/scripting area 101.

Figure 2:
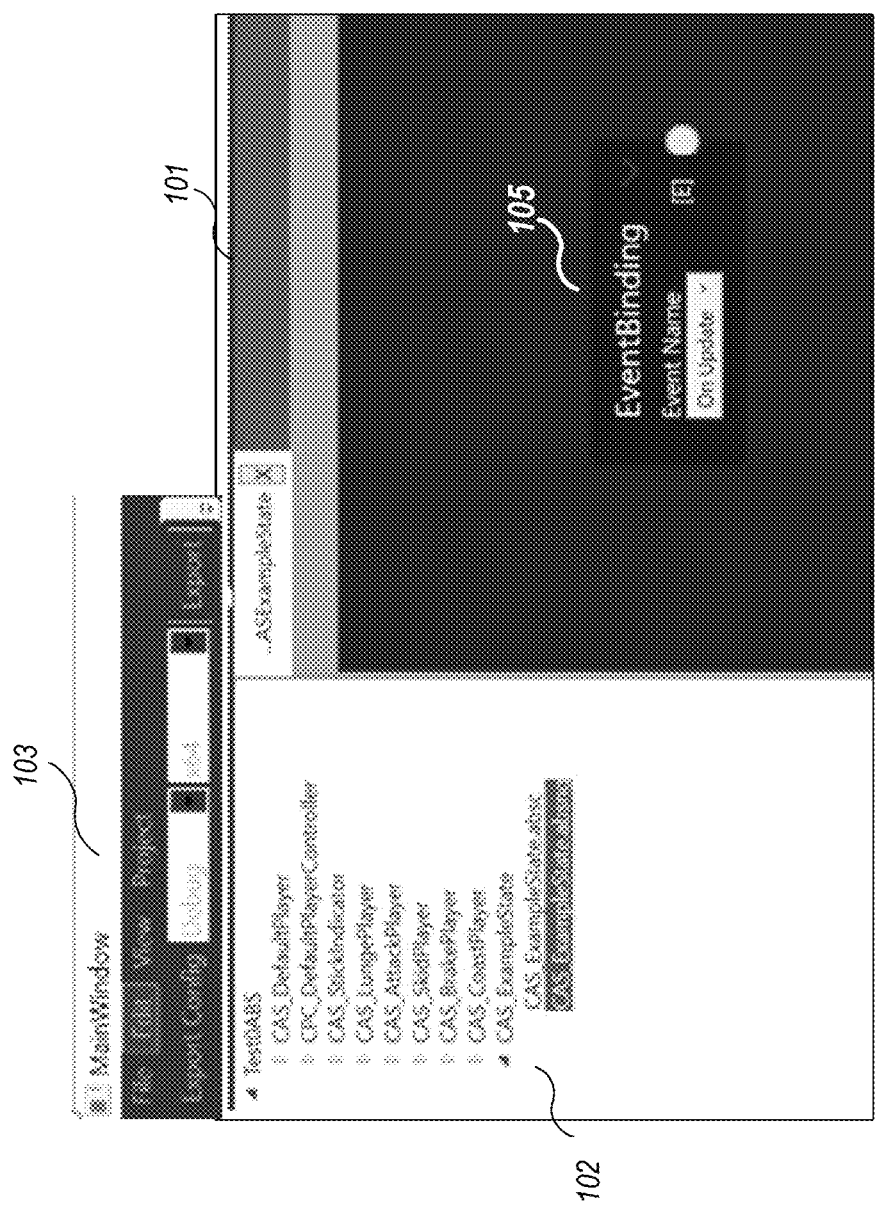
FIG. 2 is an example close up view of the menu area and project list area of the Enhanced Game Play Interactive Development Environment user interface.

FIG. 2 is an example close up view of the menu area and project list area of the Enhanced Game Play Interactive Development Environment user interface. Specifically, the menu area 103 contains a menu for the EGPIDE UI 100, which in the displayed example includes "File," "Edit," "View," and "Project Menus." In the particular EGPIDE shown, there is also an interface used to export the project definitions (classes). This may be useful, for example, in EGPIDE implementations that are run within a parent IDE such as visual studio. The export functionality enables the parent IDE to "hot" reload any changes made in the EGPIDE on demand. In other example EGPIDEs, the project folders that hold the class definitions are integrated potentially by other means. In the project list area 102, a new class definition for a new state "CAS_ExampleState" is displayed. Of note, there are 2 files illustrated—a ".absc" file for the node graph version, and an ".absng" file corresponding to the textual script version. When the ".absng" file is selected as shown in list 102, the corresponding node graph 105 is shown in display area 101.

Figure 3:
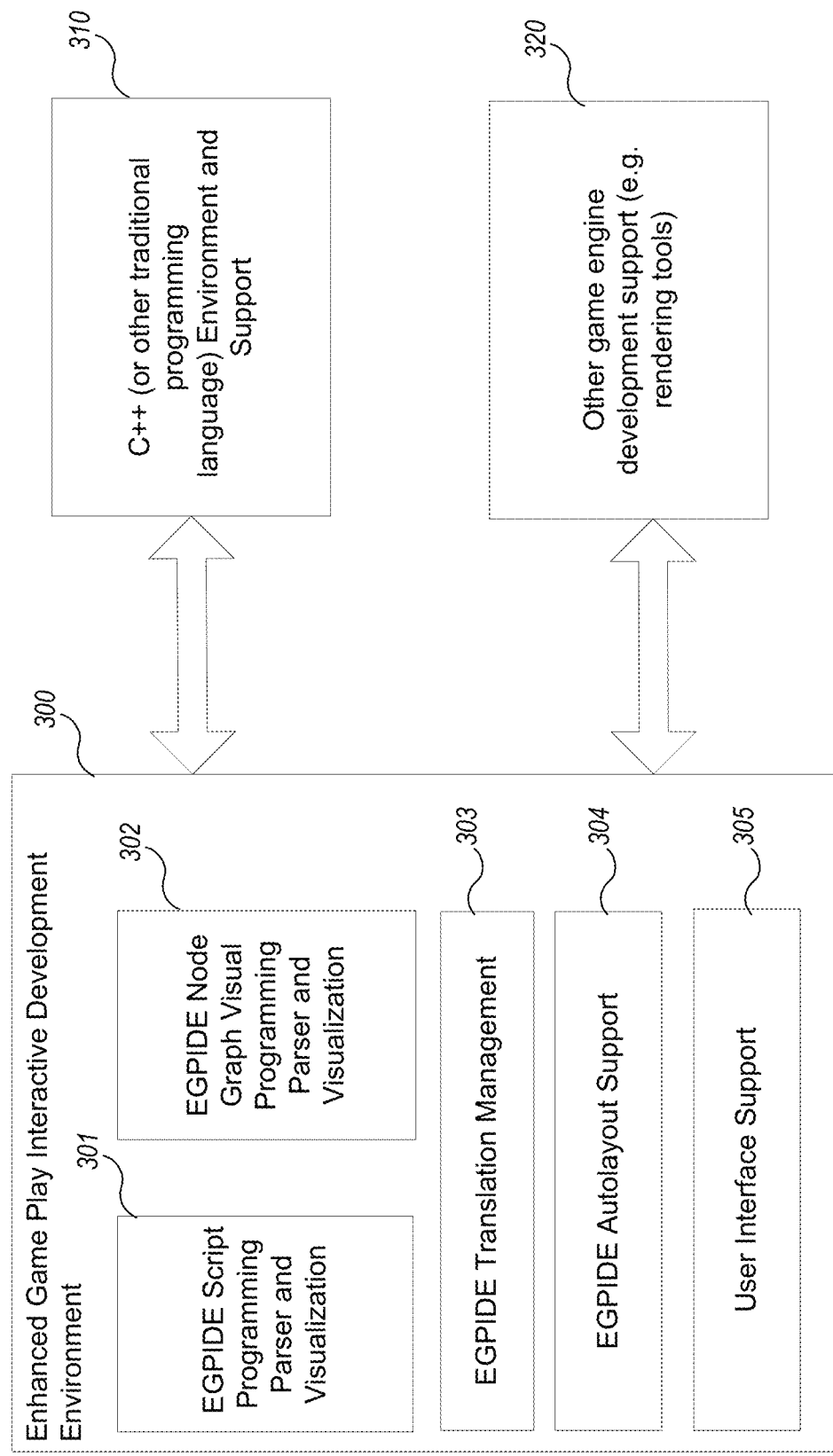
FIG. 3 is an example block diagram of components of an example Enhanced Game Play Interactive Development Environment

FIG. 3 is an example block diagram of components of an example Enhanced Game Play Interactive Development Environment. In one example embodiment, the EGPIDE comprises one or more functional components/modules that work together to provide the enhanced game development workflow described herein. For example, a Enhanced Game Play Interactive Development Environment 300 may comprise an EGPIDE script programming parser and visualization engine 301, an EGPIDE node graph visual programming parser and visualization engine 302, EGPIDE translation management 303, EGPIDE autolayout support 304, and user interface support 305. The entire EGPIDE 300 may cooperate with other systems, such as the software programming language environment and support 310 (e.g., Visual Studio), and other game engine development support 320. For example, programming language environment and support 310 may be used by a software programmer to define all of the underlying classes, data structures, variable types, and event hooks etc. that are exposed to the EGPIDE for further definition using the enhanced workflow. Similarly, the game engine development support 320 may be used by artists and the like to specific the textures, environment, backgrounds etc. that are used to render the game.

As shown in FIG. 3, the EGPIDE 300 provides support for node graph representation and for an equivalent script language representation to support the bi-directional real time conversations available in the enhanced game workflow scenario. That EGPIDE 300 is structured to enable either a game developer or a software programmer to specify behaviors in a language (node graph or script) most comfortable to them and to automatically translate and synchronize between them.

For automatic translation and presentation to occur, in one example, the EGPIDE includes translation management component 303 and two parsers: a first parser that is part of the EGPIDE node graph parser and visualization engine 302 that that can translate node graph syntax to an abstract syntax tree ("AST"), which is than translated to a textual scripting language. The node graph parser and visualization engine 302 is also responsible for the node graph visualizations supported in the user interface. Similarly, the EGPIDE includes a second parser as part of the EGPIDE script programming parser and visualization engine 301 that can translate from script to an abstract syntax tree, which is then translated to a node graph. As mentioned above, in other example EGPIDEs, no abstract syntax tree is used. In some systems, no intermediate representation is used at all. The EGPIDE 300 uses the translation management component 303 to intercept input requests for translation when needed, to invoke the appropriate parser 301 or 302, to facilitate performing the translation, and to cooperate with the user interface support 305 to display the appropriate visualizations.

In addition, in order to work most effectively and to enhance the communication and readability of the experience, when translating (or presenting) in the node graph visual language, the EGPIDE 300 performs automated layout for arranging the various nodes and connections using the EGPIDE autolayout support 304. In one example EGPIDE, the automated layout support is performed using a customized AABB (access-aligned bounding box) algorithm which has been enhanced to respond to the contextual information contained in the node graph it is being applied to. AABB algorithms are traditionally used in gaming to quickly detect the collision of 2-D objects by mapping them to a horizontal or vertical axis. The EGPIDE alignment algorithm is enhanced to form nesting and bounds based upon the relationship of the nodes in the node graph and the execution flow. Other alignment algorithms can be similarly incorporated. A detailed description of the translation process and of the automated layout process in described further below with respect to FIGS. 8-9.

As mentioned, the AbstraceIDE is one example EGPIDE implementation that incorporates the capabilities described herein. An example AbstractIDE implemented is programmed and presented within a primary IDE with its attendant user interface, such as Microsoft's Visio Studio. Accordingly, the use example shown in FIGS. 6A-6Q, which illustrates enhanced workflow collaboration in a game called "Cyclavia" (an environment geared to bicycles), also demonstrates how the AbstractIDE functions as a secondary IDE (a project) within the Visual Studio interface. This EGPIDE organization allows a software programmer to use Visual Studio to define the C++ code for the game, behavior trees, etc., export classes, definitions, macros, header files, and the like to the AbstractIDE (running as a Visual Studio project). The software programmer and the game designer can then collaborate using the Abstract IDE project to obtain the desired game flow (e.g., define all aspects of the behaviors in the behavior tree). Once they are satisfied with this collaboration, they can "export" the Abstract IDE project back to the Visual Studio parent project so that the resulting code (e.g., typically in the form of DLLs—dynamic link libraries) can be included in the executable to be run on, for example, a game engine such as the Unreal game engine. In this manner, further nativization is avoided because the entire code is transformed by the AbstractIDE into native C++, resulting in increased performance. In addition, because all the AbstractIDE code is recomputed and synchronized in the exported DLLs, the Visual Studio parent project and reload the Abstract functionality dynamically while the parent project is running—there is no need to recompile everything in the parent project.

Figure 4:
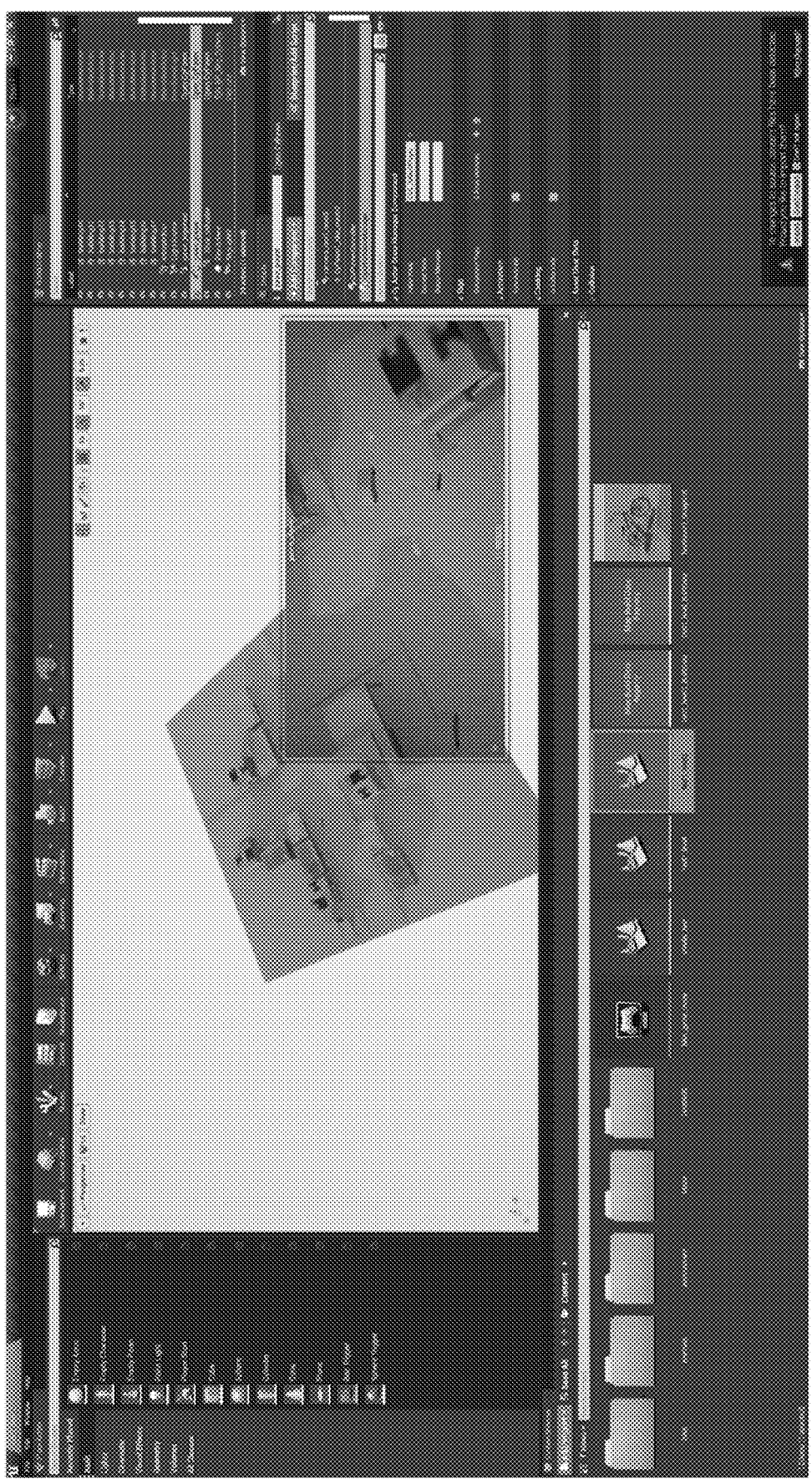
FIG. 4 is an example screen display for an example game as defined by an example Enhanced Game Play Interactive Development Environment when it is executing in a game engine.

FIG. 4 is an example screen display for an example game as defined by an example Enhanced Game Play Interactive Development Environment when it is executing in a game engine. Here, the game engine executing the game is Unreal (from Epic Games) and the example game shown is part of a game called "Cyclavia," defined by a game designer and a software programmer according to the collaborative workflow described herein. Many of the characters including the players and the enemies presented by the game itself are forms of bicycles.

Figure 5:
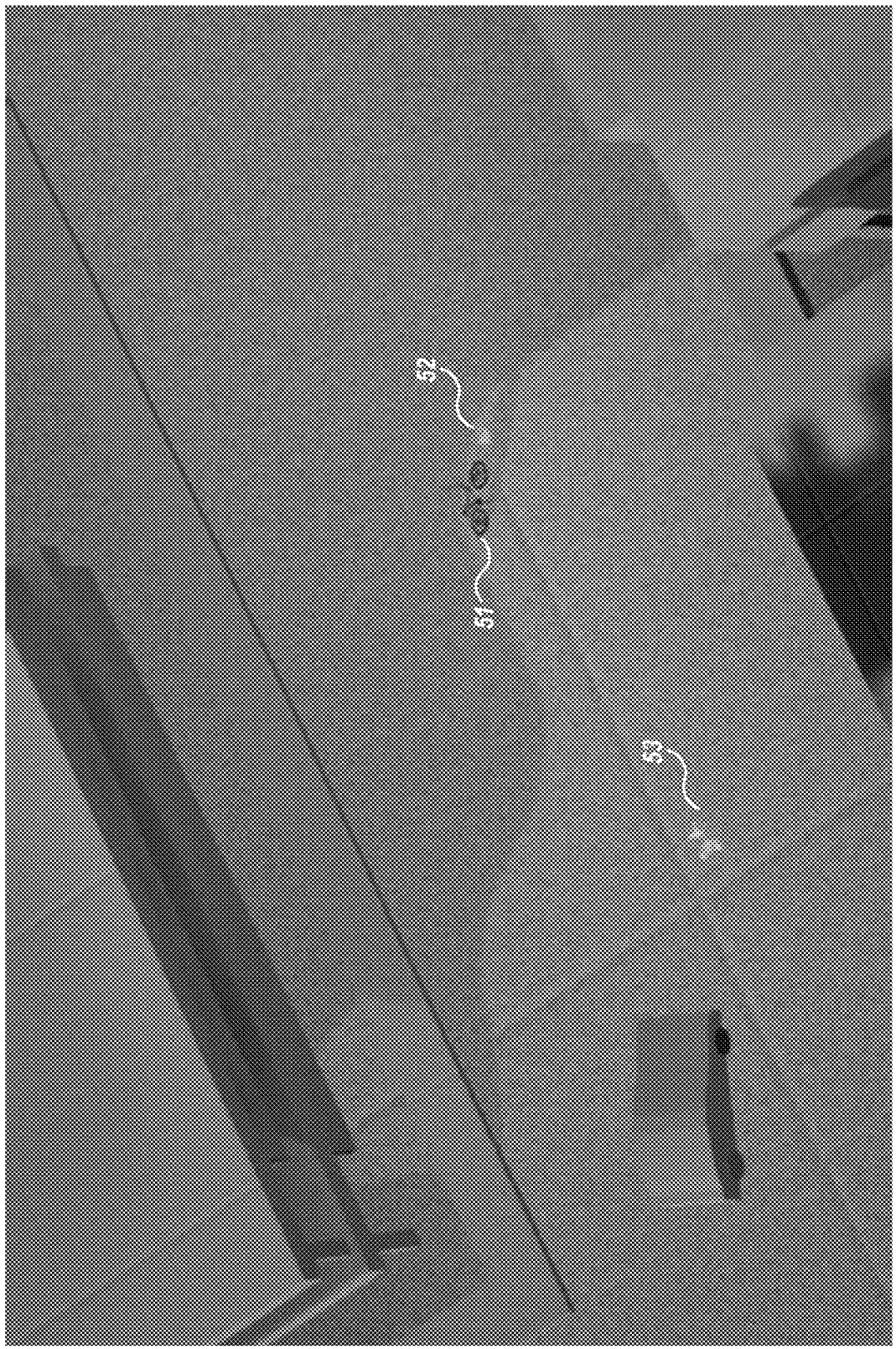
FIG. 5 is an example close up screen display of a portion of a running game which illustrates different entities with states defined by an example Enhanced Game Play Interactive Development Environment.

FIG. 5 is an example close up screen display of a portion of a running game which illustrates different entities with states defined by an example Enhanced Game Play Interactive Development Environment. In FIG. 5, bicycle player (blue bike) C1 has behaviors specified by the entity states defined by the game designer (such as for a default player), an enemy player entity C3, and a stick indicator (small orange arrow) entity C2. The stick indicator used in the example user scenario described below is an entity programmed to be bound to another entity (such as the bike C1) and faces in a direction indicated by movements of the physical controller. Here, it is shown attached to the blue bike player C1 and helps the game participant know where the controller stick is pointing so as to control the blue bike C1 more effectively in the desired direction of travel.

FIGS. 6A-6Q demonstrate an example Enhanced Game Play Interactive Development Environment user scenario that benefits from the enhanced workflow collaboration including automated translation between visual and textual programming with automated layout when both a programmer and a designer wish to collaborate on game flow behavior. To illustrated the collaborative workflow enhancements of the EGPIDE, a subset of the Cyclavia game is described. In this game, the physical game controller (e.g., joystick, game controller, keyboard, etc.) controls (i.e., can be bound to) one or more entities (e.g., characters, players, or other objects) and may be used to influence the game state of these objects. For example, in Cyclavia (abbreviated "Cy"), the entities may include player and enemy bicycles, rockets, transporters, turrets, projectiles, and other objects that have AI behavior. The software programmer has previously defined (in the C++ environment) the behavior tree for each of these entities (e.g., how they transition from one state to another), and the game designer is responsible for defining the various entitiy states and the logic that defines how these states look, act, and feel.

Specifically, in an example in which the AbstractIDE executes within a parent IDE such as Visual studio, the communication is architected as follows. The overall architecture for updating actors involves three subsystems, which are defined in C++ and mapped to AbstractIDE classes:

ActorController Class: The ActorController is responsible for computing and communicating desired state values to the ActorStateManager class. Some desired state value examples include: desired velocity, desired facing, and desired actor (entity/character) state change. The ActorController class is used for two different types of entities: AI-based (such as an AIController) in which case the desired state values are based on the simulated perception of the AI character; or player-based (e.g., PlayerController) in which case the physical controller input (e.g., from a joystick or game controller) is used to set the desired state values.

ActorStateManager Class: The ActorStateManager is responsible for receiving the desired state values from its attached ActorController class and computes that actual actor (entity/character) state values such as velocity and facing. That is, causes the actual state of the entity to be changed. The ActorStateManager manages a plurality of ActorState classes (behaviors of the entities) which can be set up by non-programmer game designers. Managed actor states are responsible for performing/effectuating the transformation of the desired state values into the actual state values via the "On Update" AbstractIDE event binding calls.

Other Game Play Systems of the Game Engine: Other systems that are part of the engine which may be influenced by the above classes include systems such as the Physics System, Rendering System, and the like. These systems receive state values from the ActorStateManager instances to perform other tasks required by the game such as physics updates (i.e., using the velocity setting of an actor/entity) and rendering updates (i.e., using the facing setting an actor/entity).

All characters in the game (both AI and Players based upon the physical controller) are comprised of instances of an ActorController and an ActorStateManager component, and communicate values to the other game play system components. ActorControllers and ActorStateManagers rely on AbstractIDE event binding definitions for its updates. For example, when the ActorController is updating, it looks for a CyPlayerController (CPC) or CyAIController (CAC) definition defined in the AbstractIDE files. When the ActorStateManager is updating its children ActorStates, it looks for CyActorState (CAS) definitions for the ActorStates defined in the AbstractIDE files.

FIG. 6A is an example project file structure in Visual Studio used to implement the AbstractIDE. The name of the parent project is Test1. Test1 is a C++ project managed in the Test1.sln file. All of the binding declarations that AbstractIDE uses are in the AbstractAccessible project. The "Cy" prefix is the naming convention specific to this project (representing "Cyclavia"). The Content/Test0ABS folder contains all of the files managed by AbstractIDE. The Source folder contains all of the files required to produce the final export files. In this particular example, the software programmer has defined two C++ classes—for actor state and an actor state manager, which are made accessible to the AbstractIDE. (Actors are entities recognized by the Unreal game engine used to run the resulting game logic produced by the AbstractIDE.) The Abstract IDE is responsible for mapping how the node graphs and scripting language is translated back to the C++ code on export. The ".abscache" file in the Source folder stores definitions of all of the nodes are available in the AIDE editors and the their corresponding C++ names in the parent project. In the AbstractIDE, there is an ability (not shown) to reload the parent project, which results in going out to the AbstractAccessible project in the parent Visual Studio (C++) project and reloading all of the information and storing it in the .abscache file.

Here, the software programmer has implemented CyActorStateManager which manages instances of CyActorState which is an class made available to the AbstractIDE as described above (e.g., so that the game designer can create and define instances of this class using AbstractIDE's node graph visual programming language). The example describes how a non-programmer game developer can work with the software programmer to implement definitions for instances of CyActorState (different entity states) in AbstractIDE.

For instance, in the example described by FIGS. 6A-6Q the software programmer has defined two types of classes (in C++)—an actor state ("CAS," which is CyActorState), and an actor state controller ("CPC," which is a CyPlayerController) for use in the AbstractIDE. As described above, the CyPlayerController class is responsible for taking what the physical game controller is doing and mapping it to data (e.g., vectors) that can be passed to actor state classes. The behavior tree defined by the software programmer defines how the CyPlayerController transitions an entity from one (actor) state to the next.

The game engine communicates with AbstractIDE's player-based ActorControllers (CyPlayerController—"CPC"), which are controlled by the physical game controller input device, via class data of the CPC instance. One example of this class definition is portrayed in FIG. 6Q. In FIG. 6Q, the data bindings 616 are shown, several of which are set before any updates are executed, and several of which are set within the CPC. The following data bindings from bindings 616 are set by the CyPlayerController prior to invocations of the "on update" event binding 617:
- Camera Look Direction: Cyclavia is a third person game so player input must be applied relative to the camera look direction.
- Player Movement Input: The physical left stick input of the gamepad controller. Modern physical controllers typically have two stick inputs. The left one is typically used for movement and the right one for looking around. For other controllers, this designation may be different.
- A, B, X, Y Button inputs: Values indicating the "pressed" state of these four buttons (typically Boolean values).
- Delta Time: The amount of time elapsed since the last update (e.g., frame).

The following data bindings from bindings 616 are set by the CyPlayerController based up calculations: Desired Velocity and Desired Facing.

FIG. 6B is an example header file for the actor state manager defined by Cyclavia. The header file 610 for CyActorStateManager illustrates that the code of this class keeps track of the current state and manages state change requests (i.e., performs switching of the actor states of an actor).

Note at the bottom of the header file 610 in section 611 the custom value type definition and the node definition. The custom value type definition ACyActorStateManager translates to the CyActorStateManager* C++ type at translation (this is example of how the translation contracts and signatures are provided between the C++ code and the AbstractIDE code). In addition, CAS_RequestStateChange defines an "execution" type node that can be used in the AbstractIDE's script language (AbstractScript) to send state change requests to an instance of CyActorStateManager.

FIGS. 6C-6D is an example header file for an actor state defined by Cyclavia. The header file 620 for CyActorState illustrates code defining a class CyActorState that is setup with two event bindings and four data bindings (as shown in section 621a and 621b). In particular, in this header file the software programmer in the underlying C++ code defines the hooks which can be used to implement behaviors as part of the behavior tree, here through the event hooks (methods) "on enter" and "on update." Actor states as defined in header file 620 also support seven data bindings which allow data to be passed between instances of the actor state manager (the parent class of the actor states) and the various actor state instances. In different example AbstractIDEs the number of bindings and/or event hooks may be different. The input structure is populated before the update methods are invoked by the ActorState instances (CyActorState or "CAS"), based upon the values stored in the data bindings in the CyPlayerController gathered from the physical controller and those calculated (see FIG. 6Q). This allows multiple ActorState instances that are all managed by the same ActorStateManager class to share and not duplicate data. Each ActorState instance is given a pointer to the input and output data structures so that appropriate data can be read and stored.

The "On Enter" event is called by CyActorStateManager when an instantiated state starts. The "On Update" event is called in CyActorStateManager::UpdateCurrentState( ) routine (method, function, etc.) when the actor state manager wishes to transition the state of an entity to a different state. In CyActorStateManager::UpdateCurrentState( ) the actor state manager first populates the input data in the "Update Input" data binding so that the AbstractScript definition for the "On Update" event binding can populate output data in the "Update Output" data binding (e.g., provides data value communication). In the example CyActorState definition (see header), there are node definitions defined for getting time lapsed since the last update (e.g., frame), current facing (e.g., direction of the bicycle), desired facing and velocity, and the ability to set velocity, facing and an output message. These define the Abstract IDE nodes that can be placed by the game designer in the node graph presentation window.

As shown in example EGPIDE of FIGS. 1 and 2, in the AbstractIDE, there are various entity states in project list area 102 that the game designer is responsible for defining. For example, for bicycle entities, the relevant states already defined in the game and referred to in the illustrations include a default state, where the entity is just moving around responsive to controller input (called "CAS_DefaultPlayer"); a lunge state (called "CAS_LungePlayer") which defines behavior when the entity is jumping or lunging; a skid stated (called "CAS_SkidPlayer") which defines behavior when the entity is turning a turn too fast (resulting in a skid); a brake stated (called "CAS_BrakePlayer") which defines behavior when the entity turns around 180 degrees quickly; and a coast state (called "CAS_CoastPlayer") which defines behavior when the entity wants to slowly come to a stop. There are two other states show for other types of entities (not players per se). The first is an attack state (called "CAS_AttackPlayer) which defines behavior when an enemy entity "sees" a player bicycle. The second is a stickindicator state (called "CAS_StickIndicator) which defines behavior for the indication arrow that appears in front of a player bicycle to indicate the direction the user intends the bicycle to travel. In the Cyclavia game, the stick indicator is responsive to commands from the physical controller and that is how a game participant indicates intended travel direction of the player's corresponding virtual player character. An example stick indicator is shown in FIG. 5. Other states for bicycles and other entities can be similarly defined.

To illustrate the capabilities of the EGPIDE for collaboration, suppose hypothetically that the game designer wishes to define a new state for a stick indicator type entity. FIG. 6D is a screen display in an example AbstractIDE illustrating an example node graph for a default StickIndicator state. User interface display area 630 with node graph/script display area 631 shows the current node graphs (defined behaviors) 635 and 636 for the entity state (labeled "CAS_StickIndicator 632 in class definition area 633. Of note, in area 632, one can observe that there are 2 subfiles for this class definition—a ".absc" file representing a script version of the state (class definition) and a ".absng" file representing a node graph representation of the same state. Selecting the ".absng" representation results in the display shown in node graph display/script display area 631. Alternatively, selection of the ".absc" representation results in a display (not shown) in the node graph/script display area 631.

In order to add a new stick indicator state type (class definition), the game designer needs to add a new build item to the project list shown in class definition area 633. For example as shown in FIG. 6F, the game designer can obtain a context menu 651 from a folder (e.g., "StickIndicator") shown using the Project Explorer view 650 of the AbstractIDE (which lists all of the currently defined class type definitionss organized by folders) and select "Add New Build Item" to create a new build item for the new stick indicator behavior the designer wishes to define. In response, the AbstractIDE displays a UI control such as that shown in FIG. 6G to allow the designer to select the class type (for example from a dropdown menu of types made available to the designer) and define a new name for the new class definition for stick indicator states. (Only one type "CyActorState" is shown as currently selectable by the designers; however, in other example AbstractIDEs more or less types are available.) Thus, any new StickIndicator state definition will be of a "CYActorState" class type and have all of the capabilities previously described with respect to the header file shown in FIG. 6C-6D. As shown in FIG. 6H, the AbstractIDE then creates a new build item for the new class definition called "Example" and inserts it into the Project Explorer view 650 in the StickIndicator folder (see new item "Example" listed in area 657). Selection of this new build item (e.g., by double clicking on "Example") results in the two empty event binding nodes 660 for event "On Enter" and 661 for event "On Update" (since all actor states can bind to these two events as described above with respect to the header file 620 for CyActorState in FIG. 6C-6D.)

Suppose, the game designer in the hypothetical then wants to define some logic for the "on enter" and "on update" events. FIGS. 6H, 6I, and 6J show in node graph visual language form the example logic created by the designer through instantiating and linking nodes and connections supported by the visual language, using an interface provided. In the example AbstractIDE, this is accomplished through use of context menus to selected an available node type (including various kinds of execution nodes, evaluation nodes, data types nodes, branches etc.) and using direct manipulation of a pointer device to connect pins on these nodes to form connections. In FIG. 6I, shown after the designer has specified the node graph, the nodes 670-673 in the "On Enter" node graph 660 initially set the output facing vector to the normalized version of the (1, 1, 0) vector. Specifically, in the node graph language used in this version of the AbstractIDE, node 670 creates a vector (1, 1, 0) which is normalized in node 67 and passed to execution node CAS_UpdateOutput_SetFacing 673, which stores the normalized vector for the new facing value using the shared data binding 671. FIGS. 6I and 6J reflect the "On Update" node graph 661 defined by the game designer. In theory, what the game designer wants to do in this StickIndicator state is to update the facing of the entity (here a stick indicator) to match a desired velocity if the velocity is greater than 80, otherwise wishes to lock the facing at its current facing (no change).

The logic programmed by the game designer is as follows. First, the logic of nodes 675-677 obtains the desired input speed from the parent class—which is the manager which gets input from the physical input controller—and stores this back out in the data binding as the new facing desired. The logic of 684-686 is intended to keep the facing at the last set facing—or in other words "lock" the facing of the entity in the current position. The logic of nodes 680-683 and 687-689 is intended to update the facing to match the desired velocity 680-683 and to store the resulting facing vector in a "blackboard" (data persistent across event binding calls) through nodes 687-689. (Storing this facing vector in the blackboard is what allows the last facing vector to be accessed in node 685 for locking the facing vector in nodes 684-686.

However, to the game designer's dismay, they have done something wrong. The facing vector is supposed to lock when the speed falls below 80 but the way it's programmed in the example illustrated in FIGS. 6I-6J, the facing vector is only locking when the speed goes above 80. (This is observable from the branch execution node 679 which shows that the locking behavior 684-686 is incorrectly invoked when the conditional evaluation node 678 evaluates to true (greater than 80).) Confused, the game designer copies the selected nodes in the screenshot shown in FIGS. 6I-6J and pastes them into a chat with the software programmer and asks for assistance.

FIG. 6L is an example screen display of the result of the game designer copying and pasting the nodes for the node graph 661 (the "On Update" event) into a textual message area 110 (FIG. 1) for the software programmer. Again, note that the textual message area 110 may be a separate program capable of using a mechanism such as a system clipboard to transfer data between applications. It may also be integrated into the AbstractIDE itself. The designer writes a note 605 such as "Hey this isn't doing anything. Can you help me figure this out? I'm trying to lock the facing vector when the speed falls below 80" to seek help. When the game designer transfers the node graph excerpt using, for example, a control+C keyboard command (or a "copy" menu item, or similar means), the example AbstractIDE is triggered to translate the nodegraph to textual form (e.g., Abstract scripting language) prior to placement in the system clipboard.

Figure 8:
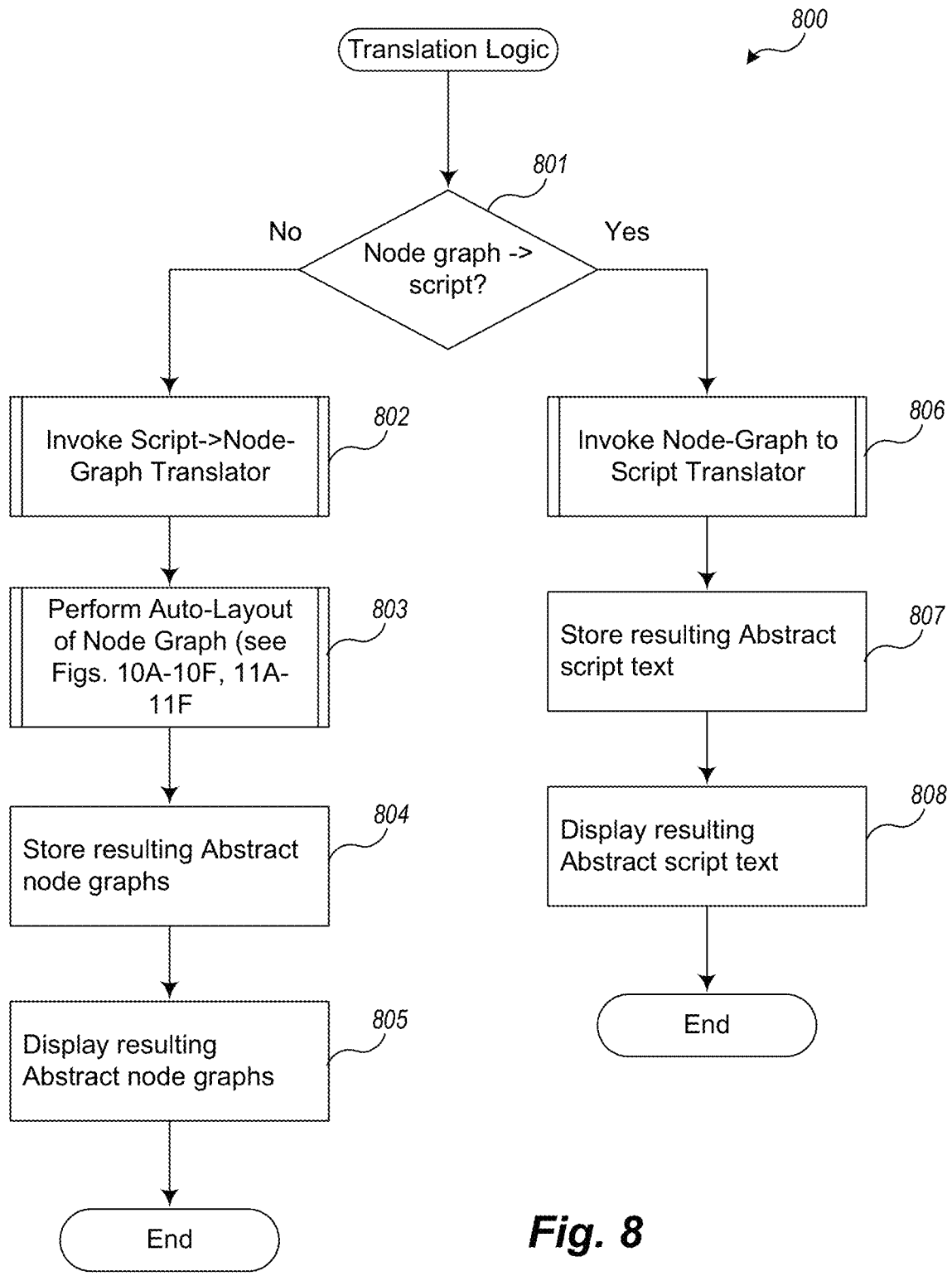
FIG. 8 is an example flow diagram of example logic provided by an example Enhanced Game Play Interactive Development Environment to perform automated translation between a node graph visual language and a scripting language.
Figure 9:
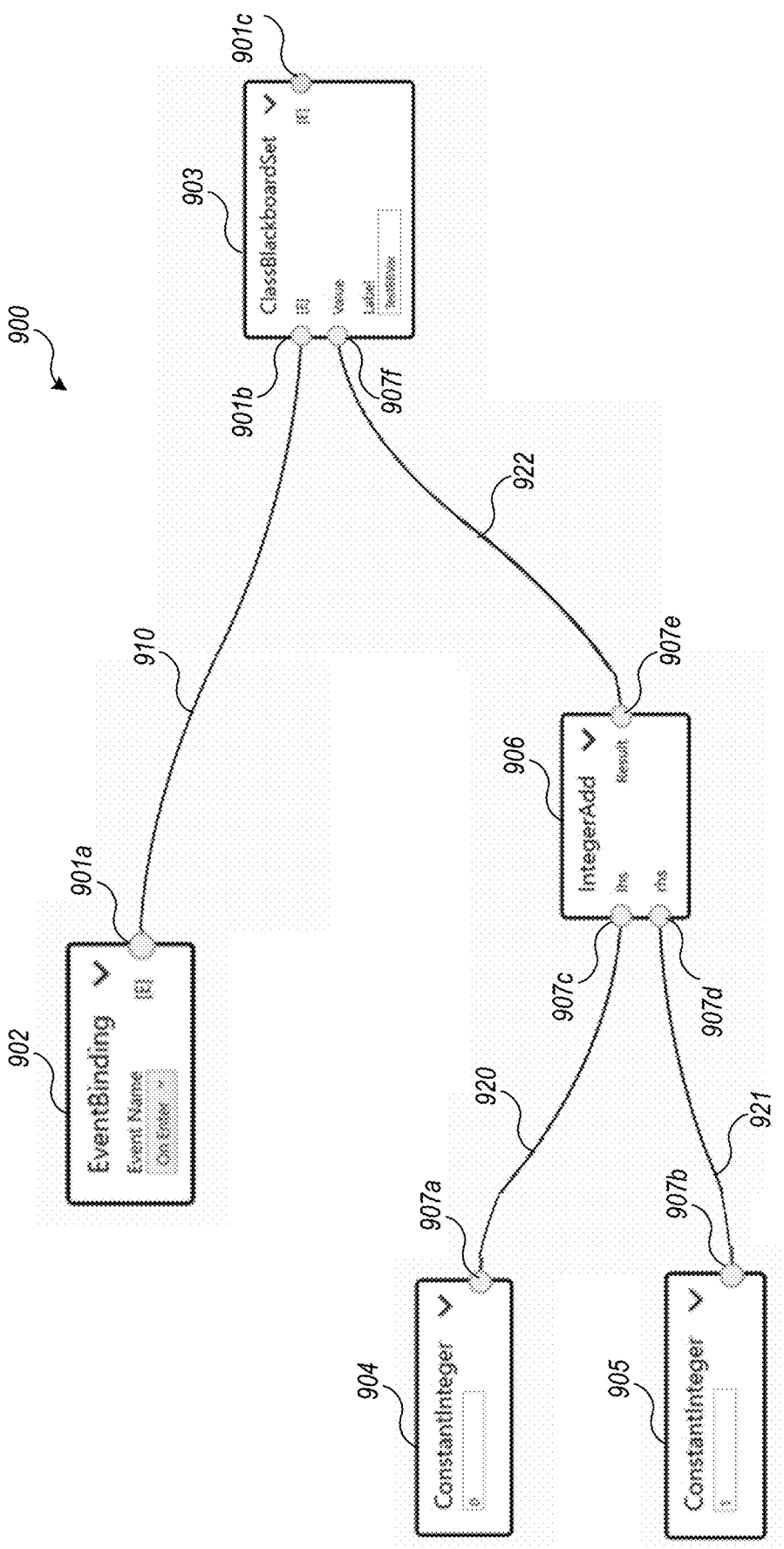
FIG. 9 is a block diagram of a typical node graph components to be processed by automated layout logic of an example Enhanced Game Play Interactive Development Environment.

Of note the text output window 110 may be created using any text editor or text editing capability that the AbstractIDE can be configured to support—the AbstractIDE translates the node graph into Abstract scripting language which is then displaying as text. AbstractIDE uses whatever mechanism is supported by the underlying operating/window system to capture and intercept input event so that the translation can occur prior to placement in the shared data resource which can be read by the target text processing code. (This capability can be achieved in many operating systems by registering or hooking into input events so that particular keystrokes or other input can be intercepted.) FIGS. 8-9 below describe the translation process in more detail.

Figure 6E:
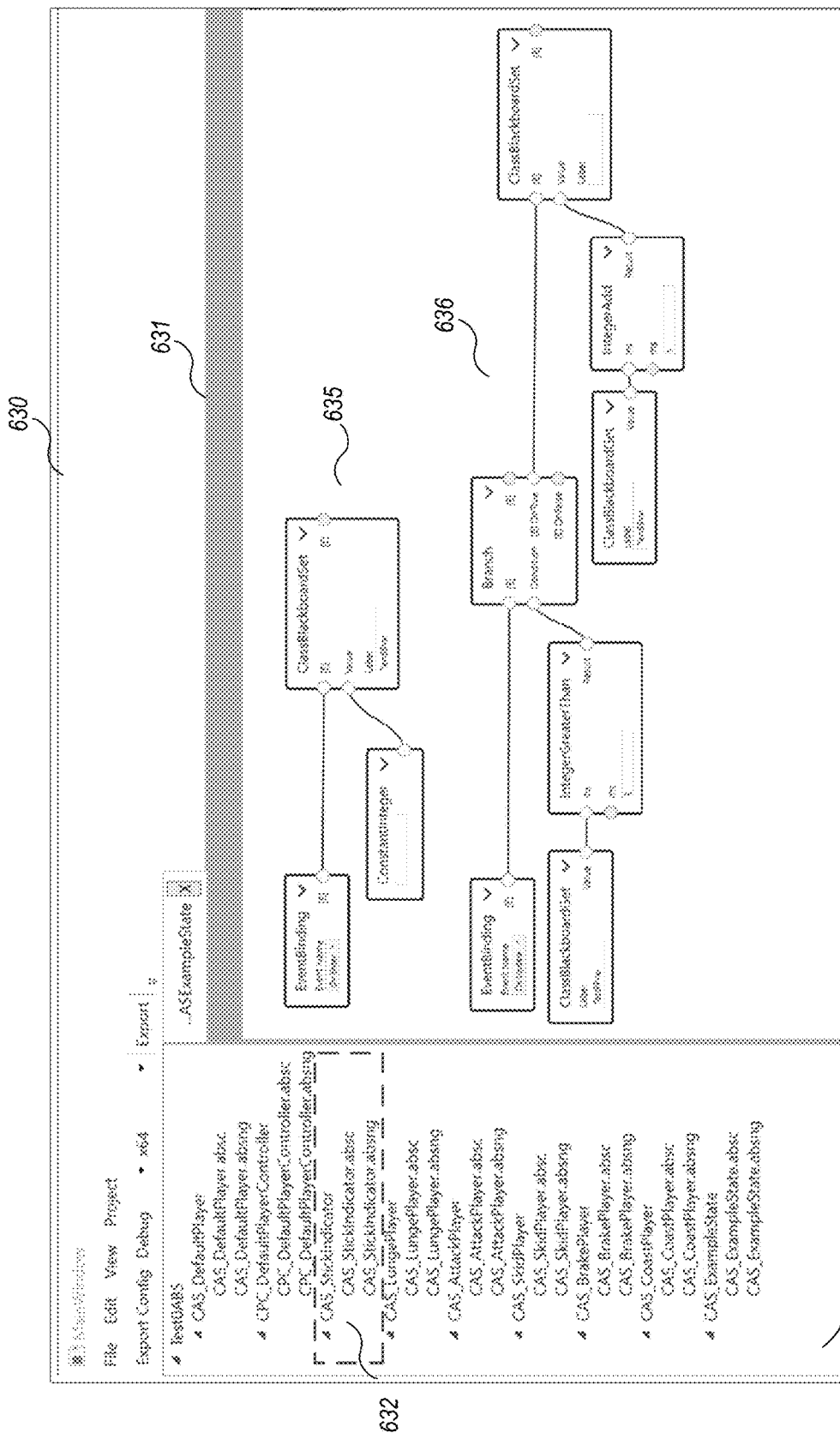
FIGS. 6A-6Q demonstrate an example Enhanced Game Play Interactive Development Environment user scenario that benefits from the enhanced workflow collaboration.
Figure 6F:
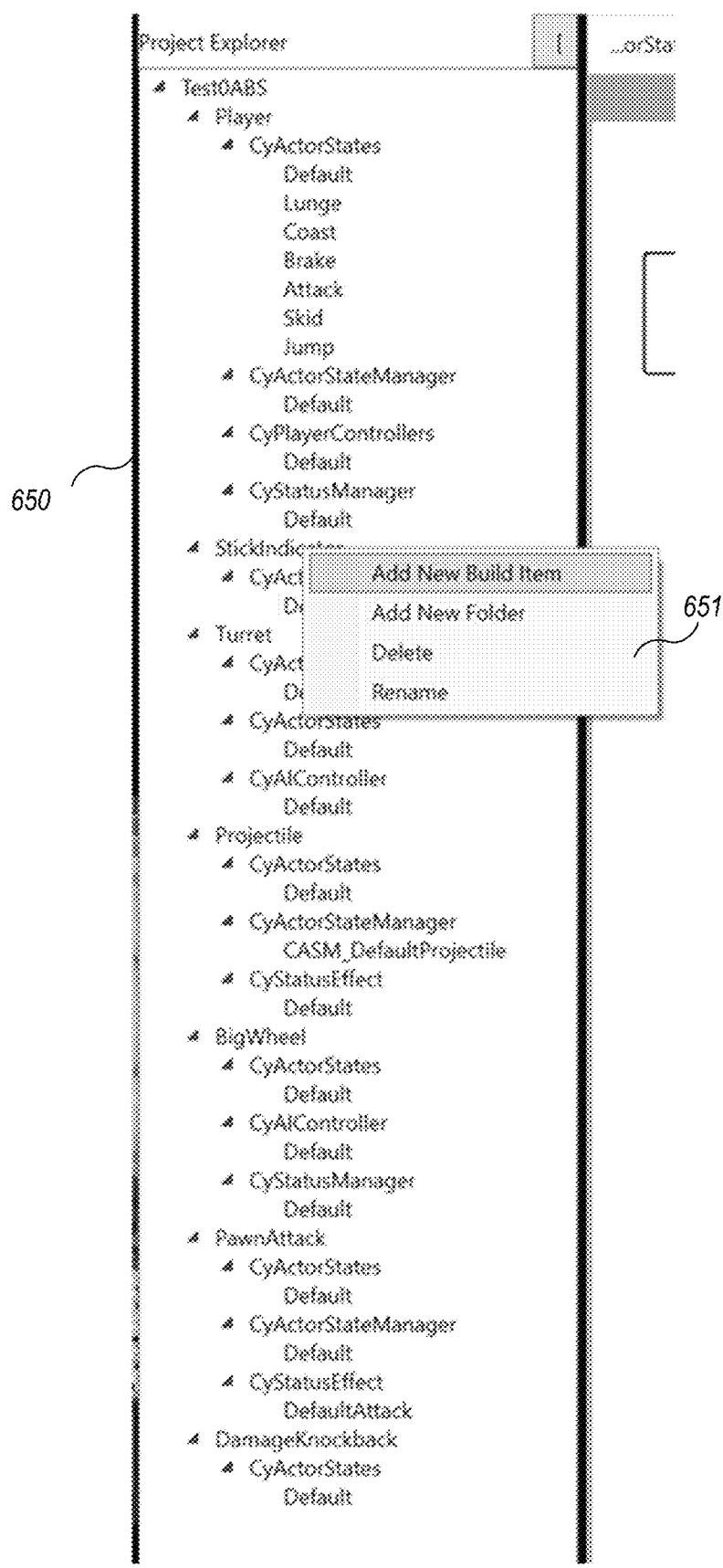
Figure 6G:
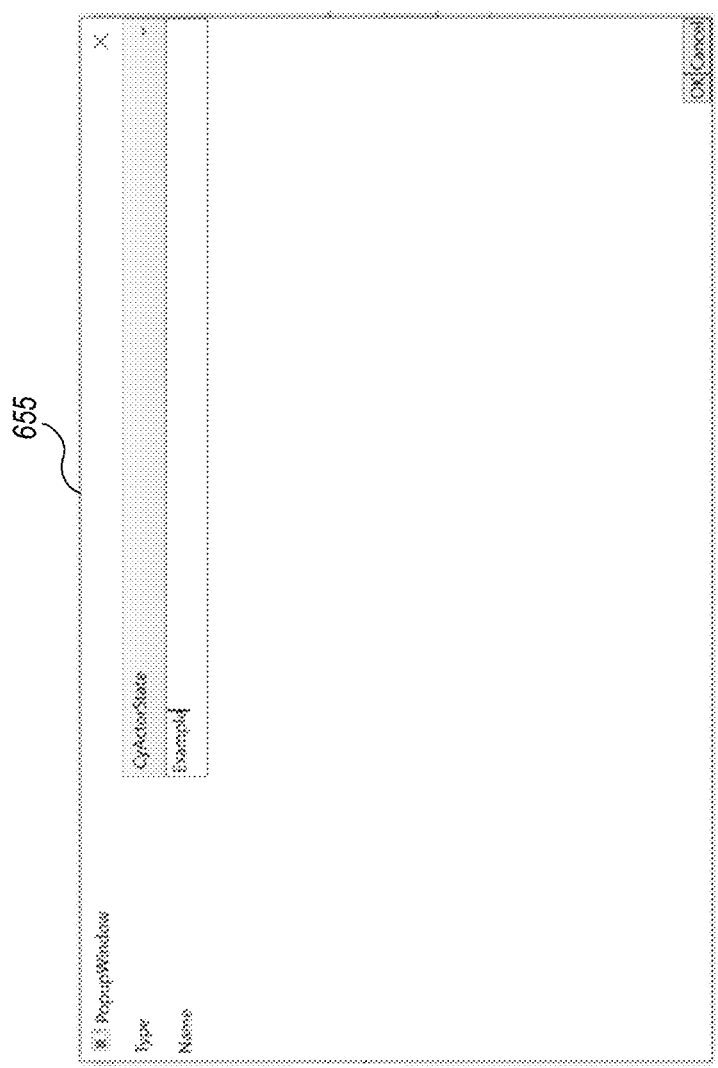
Figure 6H:
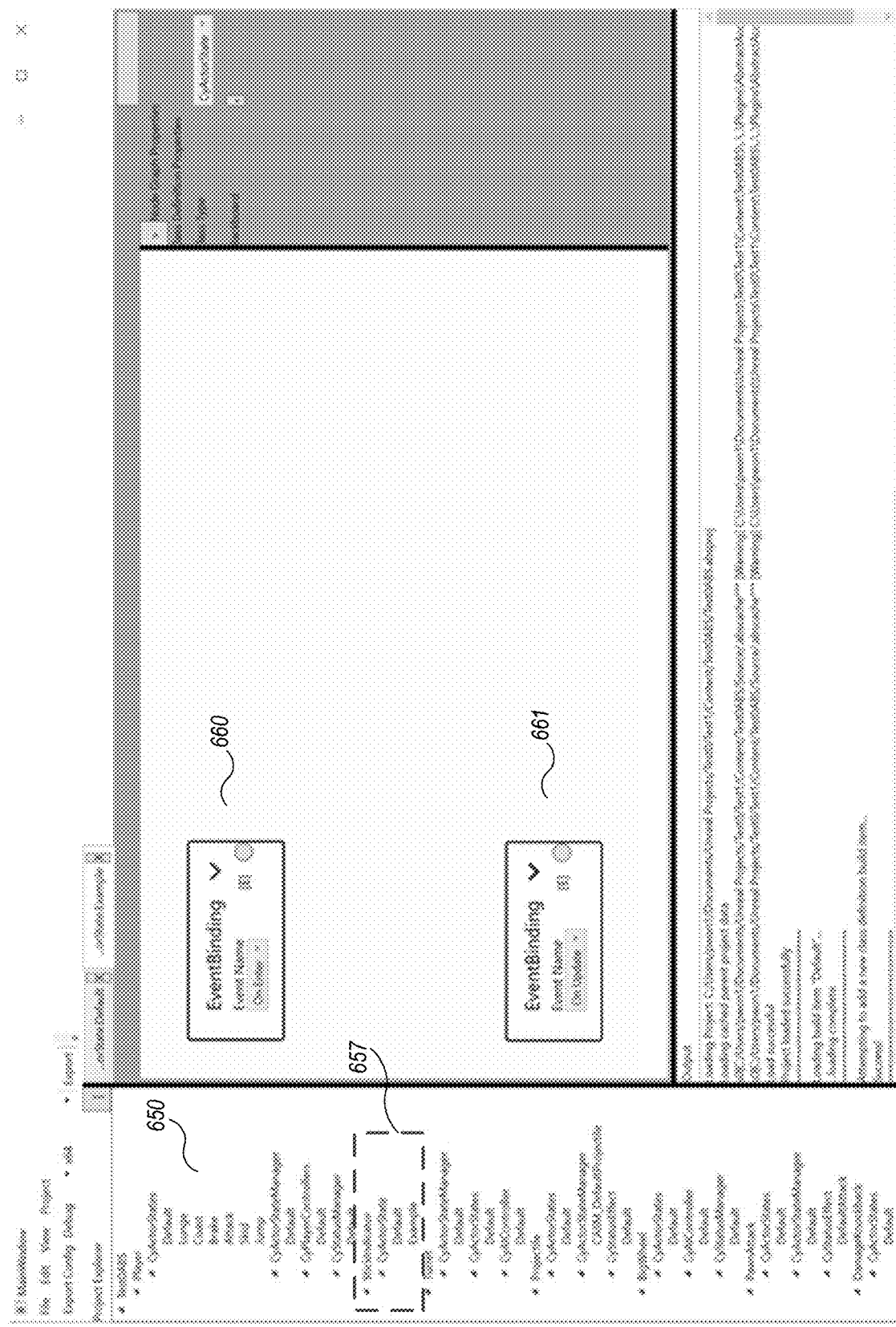
Figure 6I:
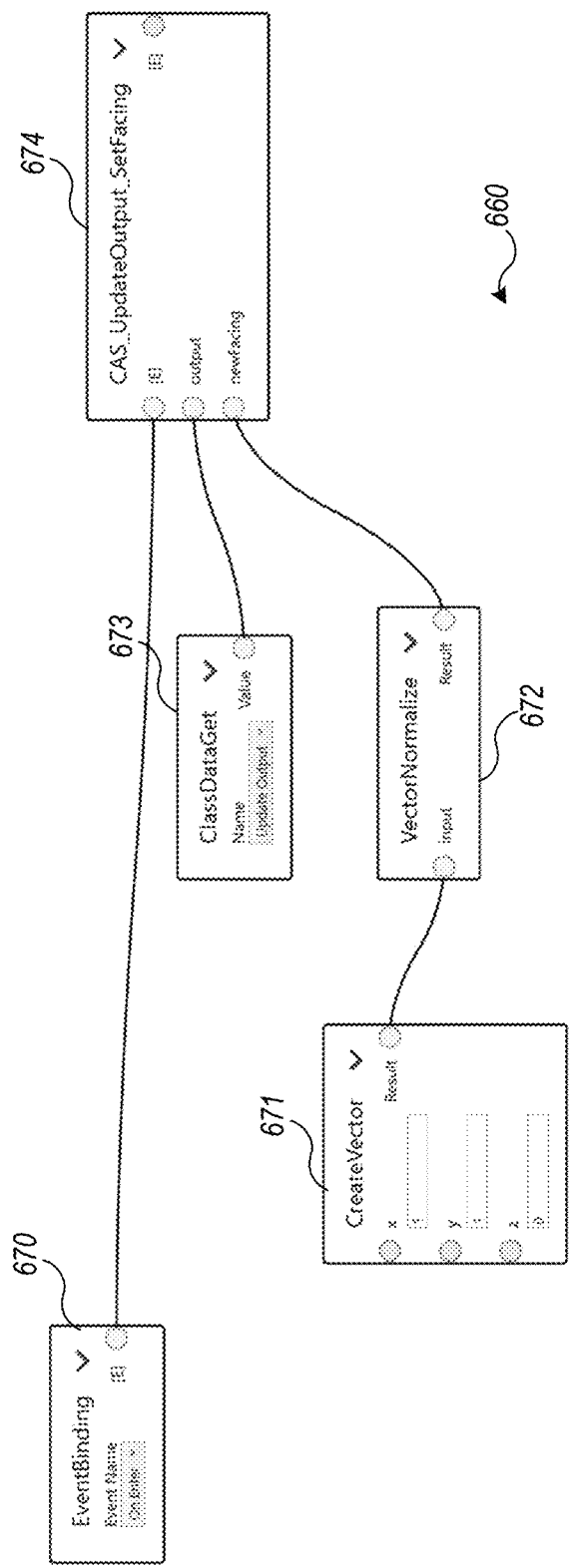
Figure 6J:
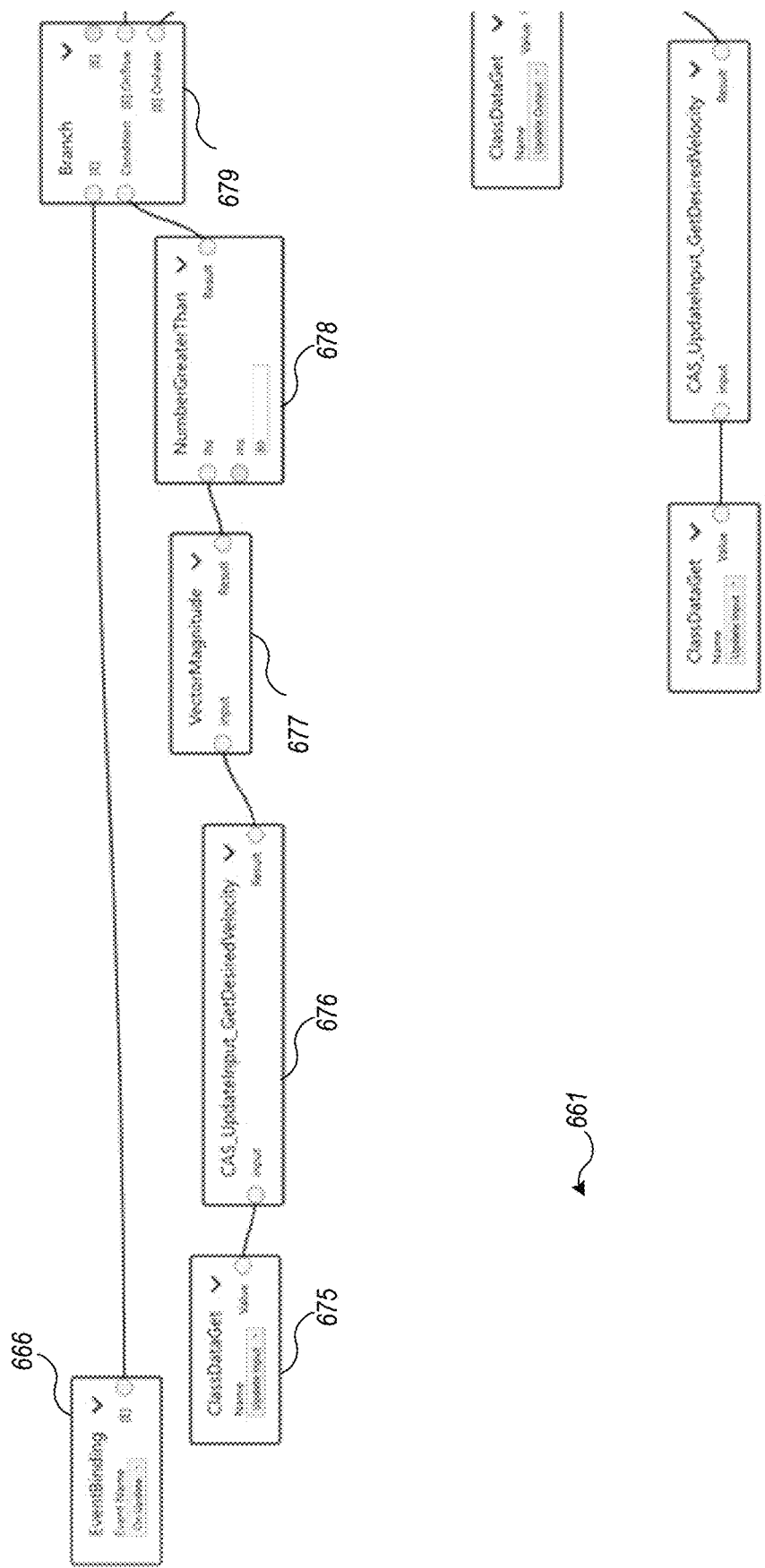
Figure 6K:
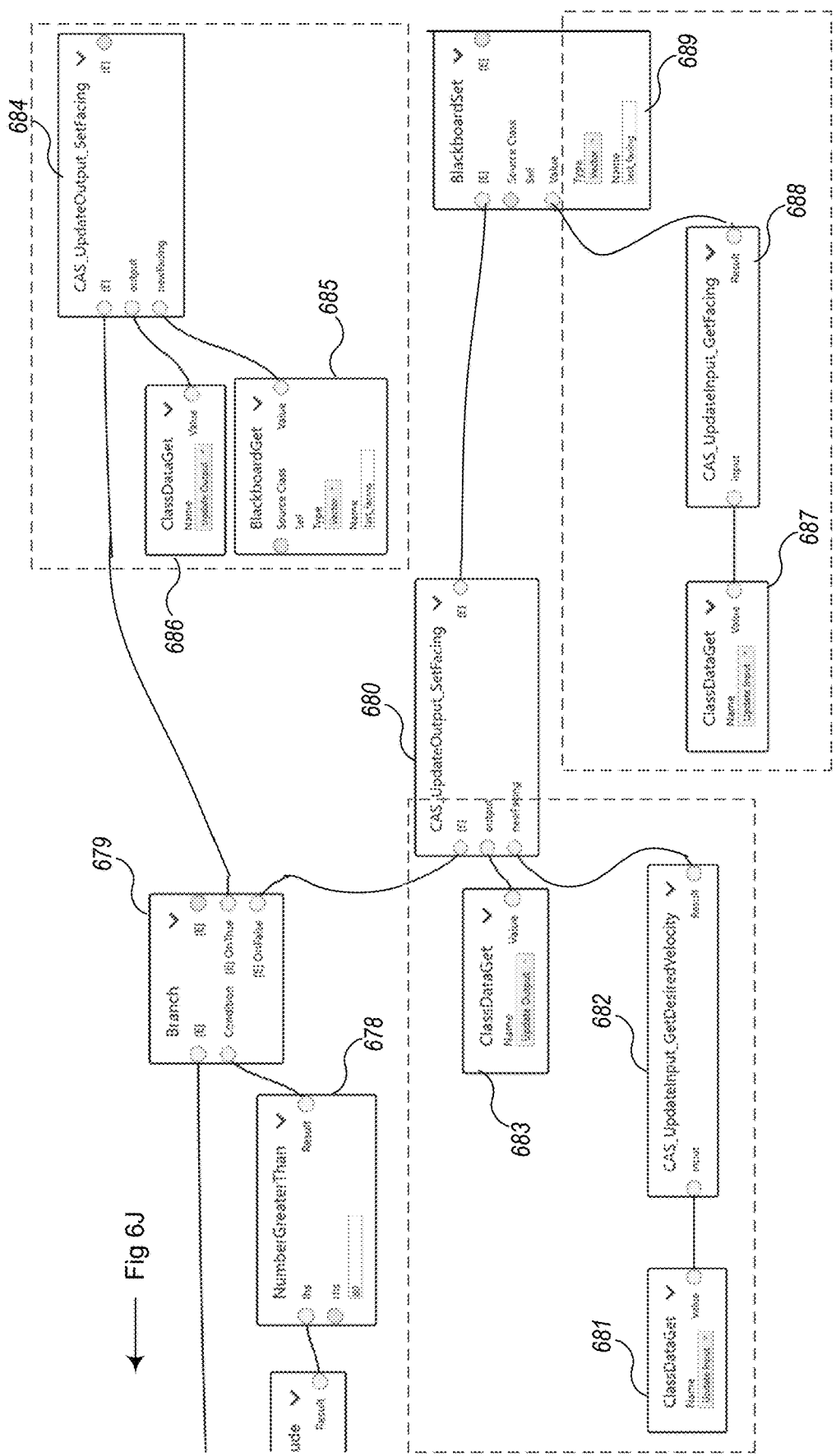

In FIG. 6L, the textual script 604 is shown in Abstract scripting language and is readable by the software programmer to detect that the error is in the conditional that the game designer selected, namely "if (NumberGreaterThan( . . . )". The software programmer responds, as shown in FIG. 6M with a revised textual script 607 and message 606 back to the game designer "Oh looks like you used the wrong node. You are using NumberGreaterThan. What you want here is NumberLessThan. Here try this instead." The game designer then copies the revised textual script 607 from in the message area 110 from the software programmer and transfers it back from the system clipboard (e.g., using a paste command, Control+V keys, etc.) into the node graph/script display area 631 (FIG. 6E), which is currently in node graph mode. Again, because the AbstractIDE is intercepting keyboard and other input events, it automatically intercepts the transfer and translates the script language from the revised textual script into node graph format before it is displayed in the display area 631. Of note, in some example AbstractIDEs, direct manipulation (drag and drop) or other forms of transfer between text based areas and node graph areas can be similarly accommodated so that the automated translation can occur.

Figure 6N:
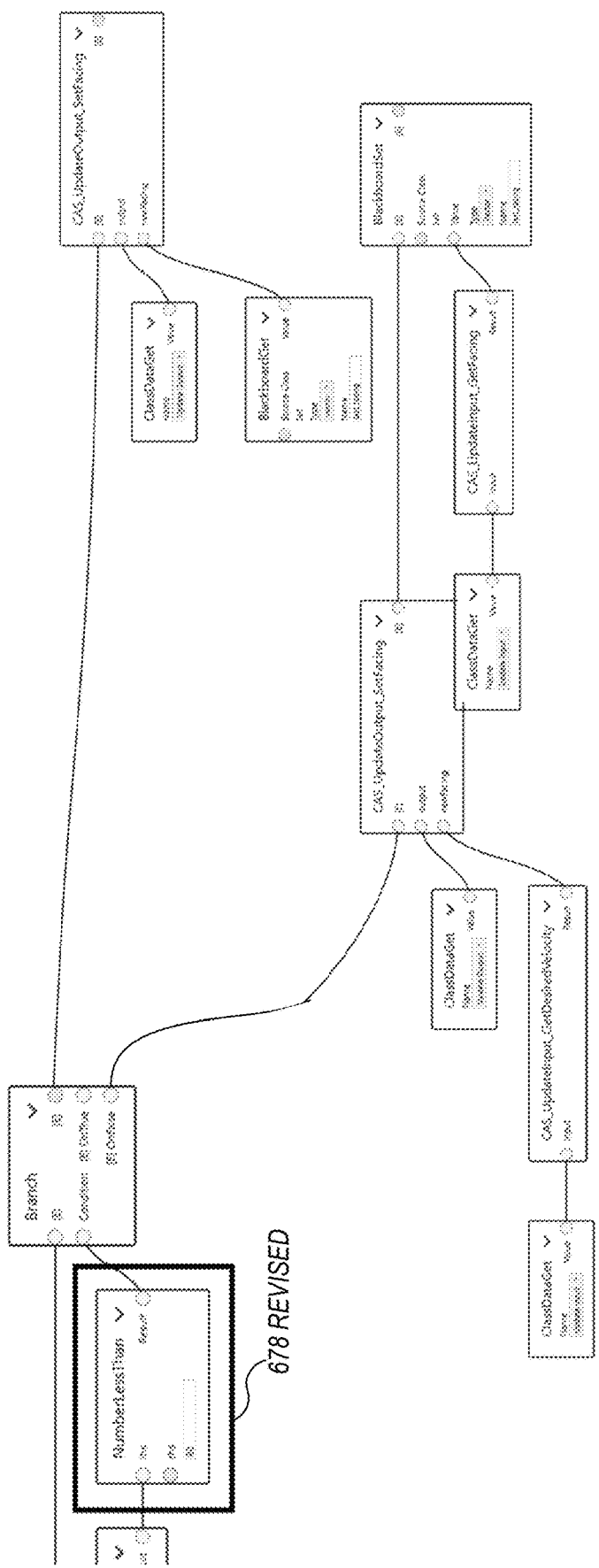

FIG. 6N is a portion of an example revised node graph produced by the automatic translation by AbstractIDE into node graph visual programming language. Revised conditional execution node 678 has been changed from NumberGreaterThan to NumberLessThan to resolve the issue. The game designer tests the new setup and it works and so deletes the old node graph.

Figure 6P:
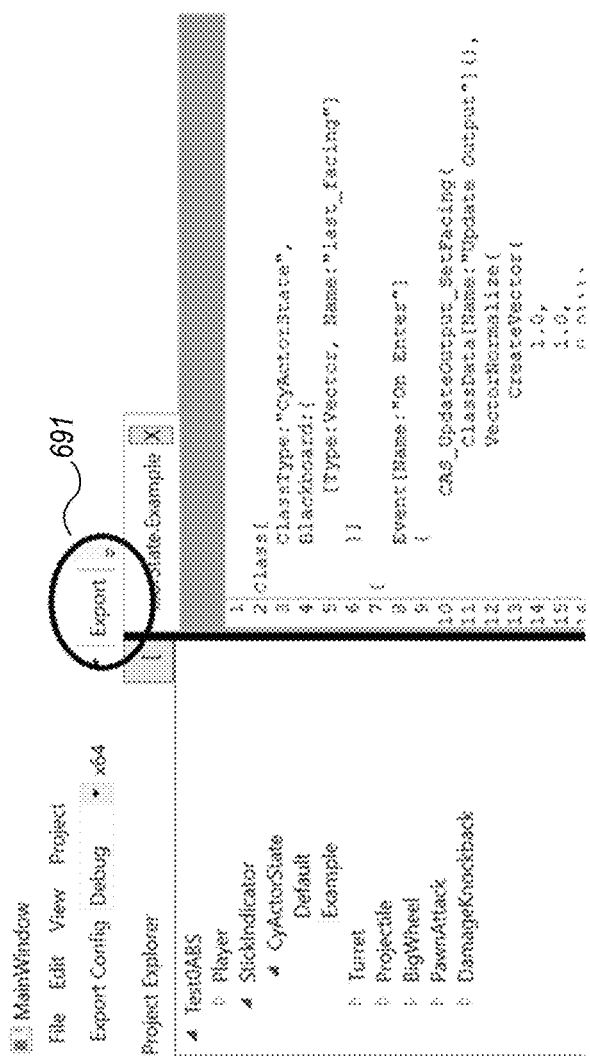
Figure 6O:
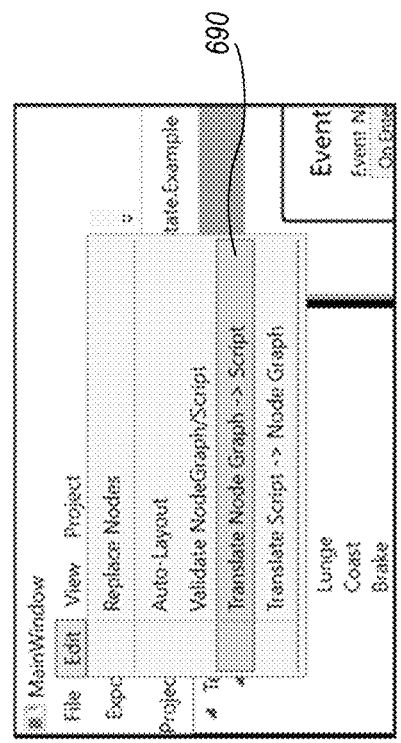

Before saving out the complete new stick indicator behavior definition for the new stick indicator state, the user is asked to sync the .absc file to the contents of the .absng file. The game designer or software programmer can perform this function using the Edit->"Translate Node Graph->Script" option 690 shown in the edit menu user interface control in FIG. 6O. This menu item causes the AbstractIDE system to synchronize the script file (.absc file) to match the logic defined in the node graph file. This process can be done in reverse if the software programmer fixes bugs or makes any optimizations in the .absc file. When all of the scripts (node graph or scripting language) are synchronized, the designer/programmer use can select the "Export" button 691 shown in FIG. 6P. The "export" action caused the AbstractIDE to produce an export file (.abex), which is an index file that the parent project (C++) in VisualStudio can read to find and load all of the new behaviors (class definitions) into the game executable through dynamic link libraries (.dll files).

Although the techniques of an Enhanced Game Play Interactive Development Environment are generally applicable to any type of game development, the phrase interactive development environment is used generally to imply any type of environment that supports code development whether or not used for the development of electronic games. Also, although the examples described herein often refer to a game development environment, the techniques described herein can also be used by any software development environment to perform enhanced workflow between visual programming typically used by non-programmers and textual programming typically used by software developers. Also, although certain terms are used primarily herein, other terms could be used interchangeably to yield equivalent embodiments and examples. In addition, terms may have alternate spellings which may or may not be explicitly mentioned, and all such variations of terms are intended to be included.

Example embodiments described herein provide applications, tools, data structures and other support to implement an Enhanced Game Play Interactive Development Environment System to be used for collaborative workflow between non-programmer game designers and software programmers. Other embodiments of the described techniques may be used for other purposes. In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the logic, different logic, etc. Thus, the scope of the techniques and/or functions described are not limited by the particular order, selection, or decomposition of aspects described with reference to any particular routine, module, component, and the like.

Figure 7:
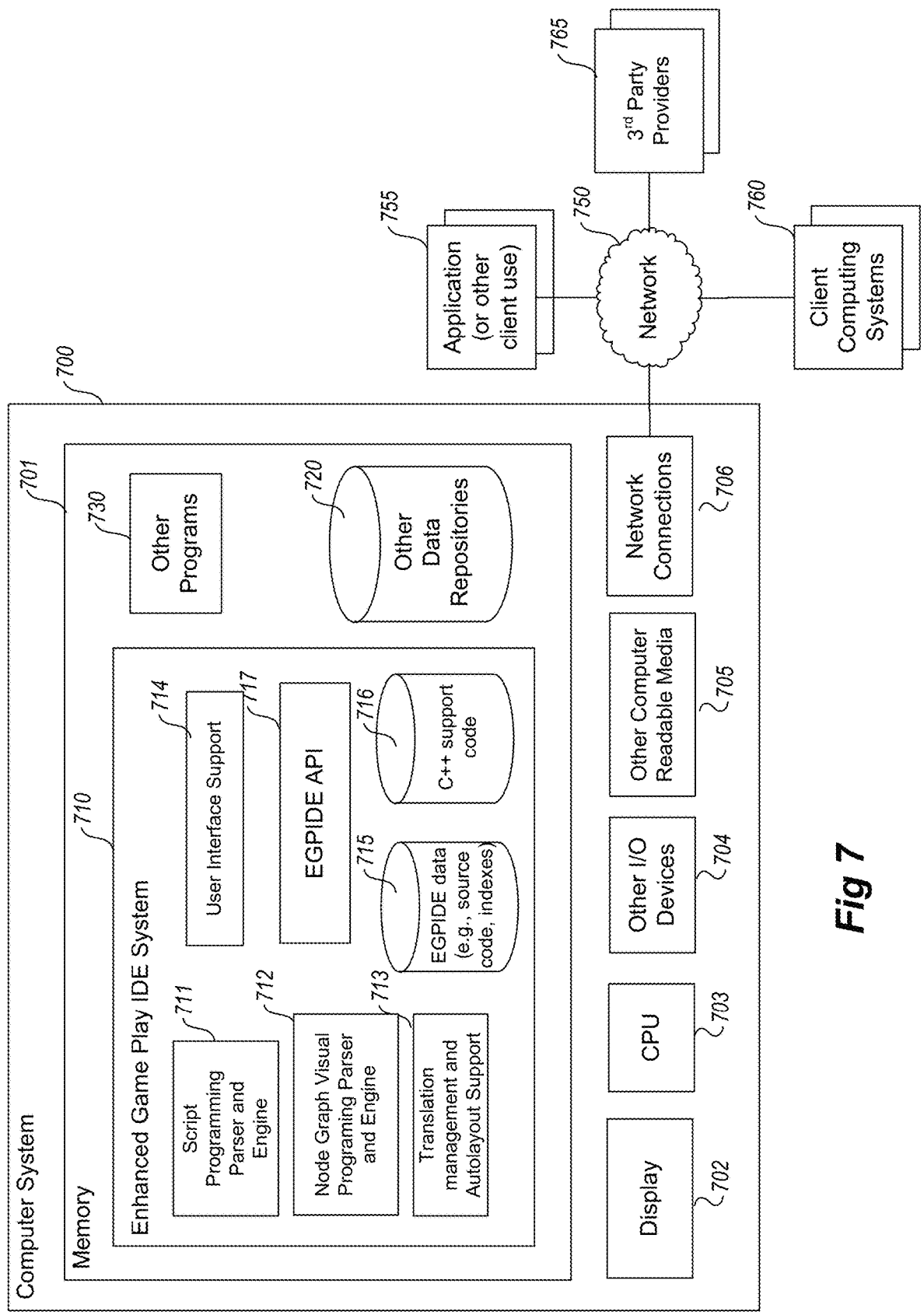
FIG. 7 is an example block diagram of a computing system for practicing embodiments of an example Enhanced Game Play Interactive Development Environment.

FIG. 7 is an example block diagram of an example computing system that may be used to practice embodiments of a Enhanced Game Play Interactive Development Environment System described herein. Note that one or more general purpose virtual or physical computing systems suitably instructed or a special purpose computing system may be used to implement an EGPIDE. Further, the EGPIDE may be implemented in software, hardware, firmware, or in some combination to achieve the capabilities described herein.

Note that one or more general purpose or special purpose computing systems/devices may be used to implement the described techniques. However, just because it is possible to implement the EGPIDE on a general purpose computing system does not mean that the techniques themselves or the operations required to implement the techniques are conventional or well known.

The computing system 700 may comprise one or more server and/or client computing systems and may span distributed locations. In addition, each block shown may represent one or more such blocks as appropriate to a specific embodiment or may be combined with other blocks. Moreover, the various blocks of the EGPIDE 710 may physically reside on one or more machines, which use standard (e.g., TCP/IP) or proprietary interprocess communication mechanisms to communicate with each other.

In the embodiment shown, computer system 700 comprises a computer memory ("memory") 701, a display 702, one or more Central Processing Units ("CPU") 703, Input/Output devices 704 (e.g., keyboard, mouse, CRT or LCD display, etc.), other computer-readable media 705, and one or more network connections 706. The EGPIDE 710 is shown residing in memory 701. In other embodiments, some portion of the contents, some of, or all of the components of the EGPIDE 710 may be stored on and/or transmitted over the other computer-readable media 705. The components of the EGPIDE 710 preferably execute on one or more CPUs 703 and manage the node graph and scripting interactive workflow, as described herein. Other code or programs 730 and potentially other data repositories, such as data repository 720, also reside in the memory 701, and preferably execute on one or more CPUs 703. Of note, one or more of the components in FIG. 7 may not be present in any specific implementation. For example, some embodiments embedded in other software may not provide means for user input or display.

In a typical embodiment, the EGPIDE 710 includes one or more script programming language parser and visualization engines 711, one or more node graph programming parser and visualization engines 712, one ore more translation management and autolayout support 713, and user interface support 714 as described herein. In addition, EGPIDE source code is maintained in one or more data repositories 715 along with imported support code in data repository 716. In at least some embodiments, the parsers 711 and 712 are provided external to the EGPIDE and is available, potentially, over one or more networks 750. Other and/or different modules may be implemented. In addition, the EGPIDE may interact via a network 750 with application or client code 755 that uses the class definition data produced by the EGPIDE, one or more client computing systems 760, and/or one or more third-party information provider systems 765, such as providers of C++ code used by the EGPIDE. Also, of note, the C++ data repository 716 may be provided external to the EGPIDE as well, for example in a repository accessible over one or more networks 750.

In an example embodiment, components/modules of the EGPIDE 710 are implemented using standard programming techniques. For example, the EGPIDE 710 may be implemented as a "native" executable running on the CPU 103, along with one or more static or dynamic libraries. In other embodiments, the EGPIDE 710 may be implemented as instructions processed by a virtual machine. In general, a range of programming languages known in the art may be employed for implementing such example embodiments, including representative implementations of various programming language paradigms, including but not limited to, object-oriented, functional, procedural, scripting, and declarative.

The embodiments described above may also use well-known or proprietary, synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously and communicate using message passing techniques. Equivalent synchronous embodiments are also supported.

In addition, programming interfaces to the data stored as part of the EGPIDE process 710 (e.g., in the data repositories 715 and 716) can be available by standard mechanisms such as through C, C++, C#, and Java APIs; libraries for accessing files, databases, or other data repositories; through scripting languages such as XML; or through Web servers, FTP servers, or other types of servers providing access to stored data. The component 715 and 716 may be implemented as one or more database systems, file systems, or any other technique for storing such information, or any combination of the above, including implementations using distributed computing techniques.

Also the example EGPIDE 710 may be implemented in a distributed environment comprising multiple, even heterogeneous, computer systems and networks. Different configurations and locations of programs and data are contemplated for use with techniques of described herein. In addition, the [server and/or client] may be physical or virtual computing systems and may reside on the same physical system. Also, one or more of the modules may themselves be distributed, pooled or otherwise grouped, such as for load balancing, reliability or security reasons. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.) and the like. Other variations are possible.

Also, other functionality could be provided by each component/module, or existing functionality could be distributed amongst the components/modules in different ways, yet still achieve the functions of an EGPIDE.

Furthermore, in some embodiments, some or all of the components of the EGPIDE 710 may be implemented or provided in other manners, such as at least partially in firmware and/or hardware, including, but not limited to one or more application-specific integrated circuits (ASICs), standard integrated circuits, controllers executing appropriate instructions, and including microcontrollers and/or embedded controllers, field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., a hard disk; memory; network; other computer-readable medium; or other portable media article to be read by an appropriate drive or via an appropriate connection, such as a DVD or flash memory device) to enable the computer-readable medium to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

As described in FIGS. 1-6, one of the functions of an EGPIDE is to automatically and transparently translate between node graph representation and script language representation.

FIG. 8 is an example flow diagram of example logic provided by an example Enhanced Game Play Interactive Development Environment to perform automated translation between a node graph visual language and a scripting language. This logic may be invoked, for example, in response to a user command (e.g., from menu items such as displayed in FIG. 6N) to translate a node graph to AbstractScript text (menu item 690) or a user command to translate AbstractScript text to a node graph, for display in the node graph/scripting display area 101. This logic is also invoked automatically in response to a user transferring (e.g., via copy, control-C keyboard commands, direct manipulation—dragging, or the like) a node graph from display area 101 to a text window (e.g., to the operating system clipboard) or in response to a user transferring (e.g., via paste, control-V keyboard command, dragging, or the like) AbstractScript text from a shared application resource such as a clipboard to a node graph display in display area 101.

In FIG. 8, the logic first determines whether the action indicates a need to translate from node graph to AbstractScript, and if so, continues in block 806, otherwise continues in block 802 to translate in reverse—from script to node graph. In block 802, the logic invokes the translator to translate each valid statement in the AbstractScript syntax to a corresponding node graph component. To do this, for each statement, the translator (after determining whether the statement is valid) parses the AbstractScript statement to an abstract syntax tree (AST) or other data structure representation of the statement, and then translates the AST into nodes and builds up a node graph in a manner similar to the example described in Table 1. Although it is helpful and typically more efficient to use an intermediate data structure such as an AST because the AST can be traversed in order (left to right, bottom up), it is possible to translate directly from the script to Abstract node graph language. Each AST for each AbstractScript statement is formed knowing the AbstractScript grammar. An example of one AbstractScript grammar 1200 is shown in FIGS. 12A-12B. Other grammars used for other AbstractScript script languages can be similarly incorporated. Once an AST is formulated from the AbstractScript statement, the translator traverses the AST and generates an appropriate node for each node in the respective node graph. In addition, in block 803, the logic calls a further logic to perform auto-layout on the generated node graph. This logic is described further below with respect to FIGS. 10A-10F and 11A-11F as applied to one of the events for a StickIndicator behavior (the "On Update" event). Once the node graphs are generated, then in block 804, the logic then stores the node graph representations, for example, in the ".absng" file in the Abstract project. Then in block 805, the logic displays the resulting node graphs in the display window 101, the translation logic then completes.

Similarly, if the logic determines in block 801 that there is a need is to translate node graph language to AbstractScript scripting language text, then in block 806 the logic invokes the translator to translate each node graph component into AbstractScript. To do this, for each node graph, the translator parses the node to create an abstract syntax tree (AST) or other data structure representation of the statement, and then translates the AST into AbstractScript script language in a manner similar to the example described in Table 2. Once the script is generated, then in block 807, the logic then stores the textual script language representations, for example, in the ".absc" file in the Abstract project. Then in block 808, the logic displays the resulting script statements in the display window 101, and the translation logic then completes.

Specifically, to understand the autotranslation process it is helpful to walk through an example of how the logic translates AbstractScript script language that represents the behaviors previously defined for a StickIndicator (see e.g., FIGS. 6D-6M) to a corresponding node graph and vice versa. Abstract node graphs have a specific data format, a "graphical" grammar, if you will. Table 1 below shows an example visual grammar for the Abstract node graph language.

TABLE 1

Node Graph Data Format

- Node Graph Properties
    - ClassType
        - An identifier that indicates which Class Binding (defined in the parent project) this node graph is a definition for
    - BlackboardEntries
        - Blackboards provide a generic data interface for memory that is persistent across event invocations
        - Each entry is defined by a type and a name
- Nodes
    - Identifier
        - GUID based identifier
    - NodeDefinitionIdentifier
        - String based identifier
        - Node definitions define:
            - Type, name and count of properties
            - Type, name and count of input pins
            - Output pin type (1 maximum and could be null)
            - Unconditional execution input pin (1 maximum and could be null)
            - Unconditional execution output pin (1 maximum and could be null)
            - Count and names of conditional execution output pins
        - Node definitions can either be:
            - Primitive
                - Hardcoded into AbstractIDE
            - Or custom
                - Defined in the parent project
    - Properties
        - Each property has a name (string) and an editor
        - Editors can be either
            - String
            - Integer
            - Number (float)
            - Boolean
            - Etc.
    - Input Pins
        - GUID based identifier (only used by evaluation links)
        - Name (string)
        - Editor
            - Editors can be any of the ones available for properties
            - If there is an evaluation link connected to the connection point, the editor is disabled TABLE 1-continued Node Graph Data Format

- If the node is a BlackboardGet or a BlackboardSet node, it can be an editor called SourceClassBinding. If there is no evaluation link connected to the connection point, the editor simply reads "Self"
  - A connection point where an evaluation link can be linked to
- Output Pin
  - If this pin is not null, it has a name and a connection point where evaluation links can connect to
- Unconditional Execution Input and Output Pins
  - GUID based identifier (only used by execution links)
- Conditional Execution Output Pins
  - GUID based identifier (only used by execution links)
  - Name (string)
  - Only used by Branch nodes (if/else statements) and While nodes
- Evaluation Links
  - Output node identifier (GUID)
  - Input node identifier (GUID)
  - Input pin identifier (GUID)
- Execution Links
  - Output execution node identifier (GUID)
  - Output execution pin identifier (GUID)
  - Input node identifier (GUID)

Figure 15A:
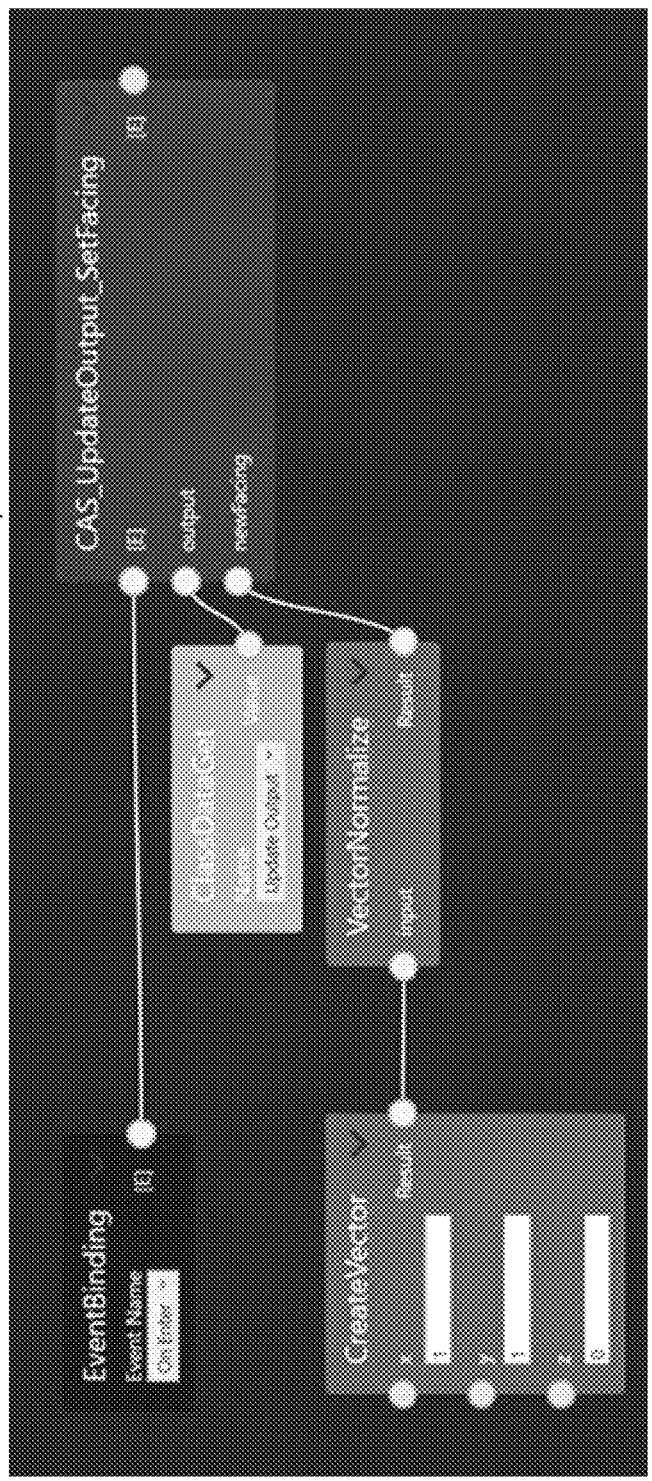
FIGS. 15A-15B are example node graphs for an entity in an example Enhanced Game Play Interactive Development Environment.
Figure 15B:
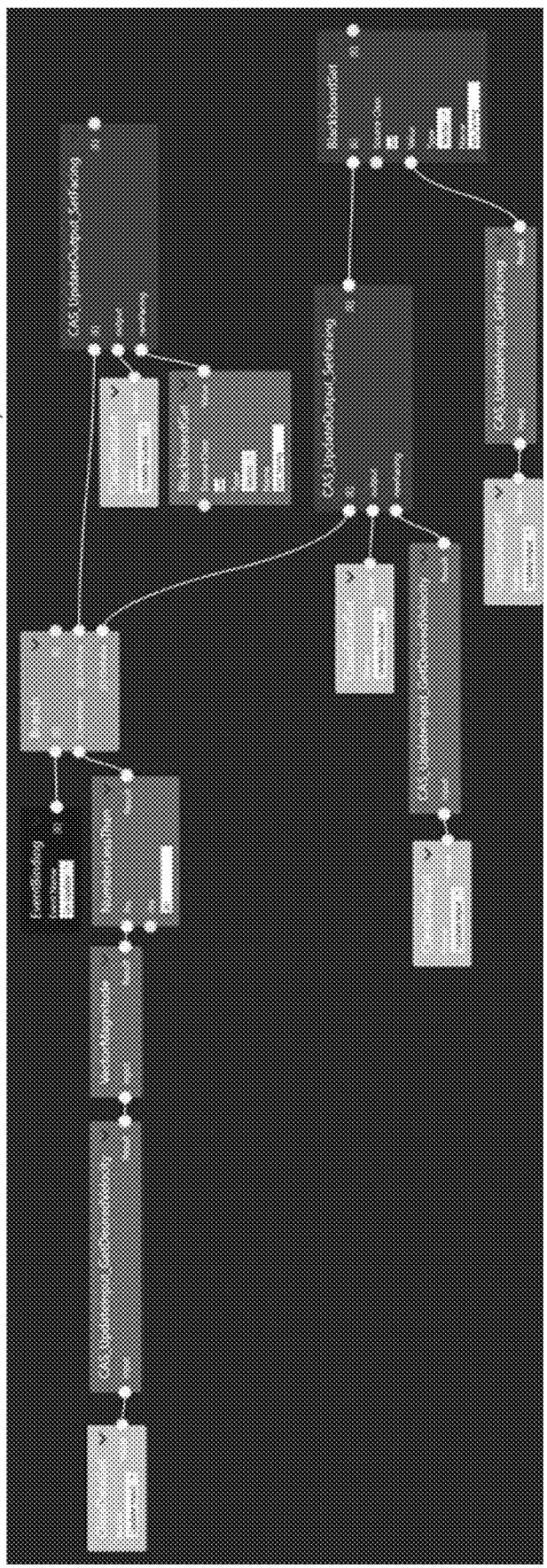

The example script 1300 for the StickIndicator behaviors for the "On Enter" and "On Update" event is illustrated in FIG. 13. This represents the desired output when the logic is translating from node graph representation to script language representation, for example in blocks 806-808 in FIG. 8. The corresponding example node graphs are illustrated in FIGS. 15A-15B. This represents the desired output when the logic is translating from a script language representation to node graph representation, for example in blocks 802-805 in FIG. 8. FIGS. 14A-14D illustrate the intermediate data structure used by both translators—in this case an abstract syntax tree for the StickIndicator example.

When translating from script language to node graph for the StickIndicator script shown in FIG. 13, the following steps are performed as shown in Table 2:

TABLE 2

Script to Node Graph Translation Example

1. The script in raw text format is parsed and converted into an Abstract Syntax Tree (AST)
   a. FIGS. 12A-12B shows the parsing grammar 1200 used in this conversion
   b. FIGS. 14A-14D shows the resulting AST
2. The AST is then traversed in a depth-first fashion (from top to bottom line by line)
   a. At the root Class Binding AST element
      i. The ClassType and BlackboardEntries is used to populate the Node Graph Properties
      ii. The ChildrenBindings are traversed one at a time
         1. ChildrenBindings of a ClassBinding can only be EventBindings
         2. For each EventBinding
            a. Start by adding an EventBinding node. An EventBinding node has one string editor for the name. Populate it with the Name value of the EventBinding AST element
            b. Set the EventBinding node's unconditional execution output pin as the "Execution Head". The Execution Head is a reference to an execution output pin that is used to keep track of where to connect the next execution node
            c. Iterate through the ChildrenStatements
               i. If the statement is a FunctionCall
                  1. Create a node with the Identifier value as the NodeDefinitionIdentifier
                  2. Create an execution link between the Execution Head and the unconditional execution input pin of the newly created node
                  3. Set the Execution Head to the unconditional execution output pin of the newly created node
                  4. Traverse the AST params one at a time and populate the properties and then the inpins using the following logic:
                     a. Keep track of the paramIndex
                     b. When paramIndex < properties.Count, populate properties[paramIndex] with the AST param value (should be a constant value)
                     c. When paramIndex >= properties.Count, populate inPins[paramIndex − properties.Count] with:

TABLE 2-continued

Script to Node Graph Translation Example i. If a FunctionCall, create a node with the Identifier value as the NodeDefinitionIdentifier. Then, create an evaluation link between the new node's output pin and the target inPin. This step can be recursively called on the new node.
        ii. If a constant value, fill the inPin's editor with that value
   ii. If the statement is an IfElseStatement,
       1. Create a Branch node and create an execution link between the Execution Head and the unconditional execution input pin
       2. Populate the Condition input pin using the process described above for generic FunctionCalls
       3. Set the Execution Head to the OnTrue conditional execution pin and traverse the OnTrueStatements AST elements
       4. Then, set the Execution Head to the OnFalse conditional execution pin and traverse the OnFalseStatements AST elements
       5. Finally, set the Execution Head to the unconditional output pin of the Branch node
3. The ChildrenStatements should be blank Conversely, when translating from node graphs 1500 (On Enter event) and 1510 (On Update event) to script language for the StickIndicator node graph shown in FIGS. 15A-15B, the following steps are performed as shown in Table 3:

TABLE 3

Node Graph to Script Translation Example

1. First the node graph needs to be translated into an AST
   a. Start by creating a ClassBinding AST element
      i. Populate the ClassType and BlackboardEntries values by using the values from NodeGraphProperties
   b. Iterate through the nodes and find the EventBinding nodes
      i. For each EventBinding node
        1. Create an EventBinding AST element
        2. Set the name to the value set in the Event Name property string editor
        3. Traverse to the next execution node using the execution link connected to the unconditional execution output pin
        4. For each execution node:
          a. Create a FunctionCall AST element
            i. Populate the Params list using the properties and input pins (and the evaluation links connected to them) of the node
            ii. Insert the new FunctionCall AST element into the ChildrenStatements of the EventBinding AST element
          b. If the execution node is a Branch (if/else) node, create an IfElseStatement AST element
            i. Populate the ConditionExpression by traversing the nodes connected to the condition input pin via evaluation links
            ii. Populate the OnTrueStatements by traversing the nodes connected to the OnTrue conditional execution output pin via execution links
            iii. Populate the OnFalseStatements by traversing the nodes connected to the OnFalse conditional execution output pin via execution links
        5. Add the new EventBinding AST element to the ChildrenBindings of the ClassBinding AST element
2. Once you have the AST, follow the grammar rules (FIGS. 12A-12B) backwards to convert the AST into raw script text.

As described earlier, one of the functions of an EGPIDE is to automatically layout nodes in a node graph so that they are non-overlapping when they are automatically translated and inserted into a node graph display area.

FIG. 9 is a block diagram of a typical node graph components to be processed by automated layout logic of an example Enhanced Game Play Interactive Development Environment. In order to understand the enhanced auto-alignment bounding box (AABB) algorithm used for the EGPIDE autolayout it is helpful to refer to the node graph components. In FIG. 9, there are 4 nodes in the node graph 900: execution node 902, execution node 903, and evaluation nodes 904-906. Each execution node, for example node 903, has one or more execution pins 901a-901c. Links between two execution pins (e.g., pin 901a and 901b) are referred to as execution links. For example, execution link 910 links execution pins 901a to 901b. Each evaluation node, for example node 906, has one or more evaluation pins, for example pins 907a-907f. Links between two evaluation pins (e.g., pins 907a and 907c) are referred to as evaluation links. For example, evaluation link 920 links evaluation pins 907a to 907c; evaluation link 921 links evaluation pin 907b to 907d; and evaluation link 922 links evaluation pin 907e to 907f. The node on the left side of a link is referred to as an output node and the node on the right side of a link is referred to as an input node. For example, for the evaluation link 920, node 904 is an output node of link 920 and node 906 is the input node for link 920.

Some additional nomenclature to understand the construction and layout rules includes:
Output node siblings are output nodes for links that link to the same input node. For example, output nodes 904 and 905 are output node siblings because they both link to the same input node 906.
The output index of an evaluation link is the index of the evaluation pin for the link in the input node's list of incoming links. For example, if the index of evaluation pin 907c is 1 and the index of evaluation pin 907d is 2, then the output index of evaluation link 920 is 1 and the output index of evaluation link 921 is 2.
A leaf AABB doesn't have any children. They are typically just for keeping track of nodes but they may also be used for indentations.
A branch AABB always has two children. Branch AABBs can have one of five alignments (Center, Top, Bottom, Left, and Right) and one of two orientations (Horizontal or Vertical).
A root AABB is the AABB at the top of the AABB tree
An evaluation unit AABB of a node is the AABB that encompasses all of the nodes that can be reached via evaluation links in the output (left) direction.

The EGPIDE autolayout algorithm examines the node graph to be laid out, first constructs all of the bounding boxes and nests them according to evaluation and context as described in FIG. 9. Then, once the nesting is constructed according to evaluation, then the EGPIDE autolayout logic aligns the boxes according to an alignment and orientation rules.

FIGS. 10A-10F show a sequence of applying a set of construction and layout rule logic to a node graph in an example Enhanced Game Play Interactive Development Environment. Many different construction and alignment rules may be incorporated in the EGPIDE logic. In one example EGPIDE, an example set of construction rules specifies AABB construction logic (AABB Construction Rules) as follows:

1. Each node is assigned a leaf level AABB that is exactly the size of the node (fits around the node).
2. For each evaluation link:
   a. If the output node is an execution node, do nothing
   b. If the output node is an evaluation node:
      i. Create a (center-aligned) horizontal AABB around the output node's root AABB and the input node's AABB. If the input node is an execution node, use top-aligned horizontal AABB instead.
      ii. OR insert the output node's root AABB into a (right-aligned vertical) AABB based on the output index of the link if the input node is already in an evaluation unit AABB
         1. (OPTIONAL) insert an extra arbitrarily sized AABB at the root level of the AABB with all of the output siblings for indentation purposes if the input node is an execution node
3. For each execution link, place the evaluation unit AABB of the output node and the root AABB of the input node in a center-aligned horizontal AABB.

Figure 10A:
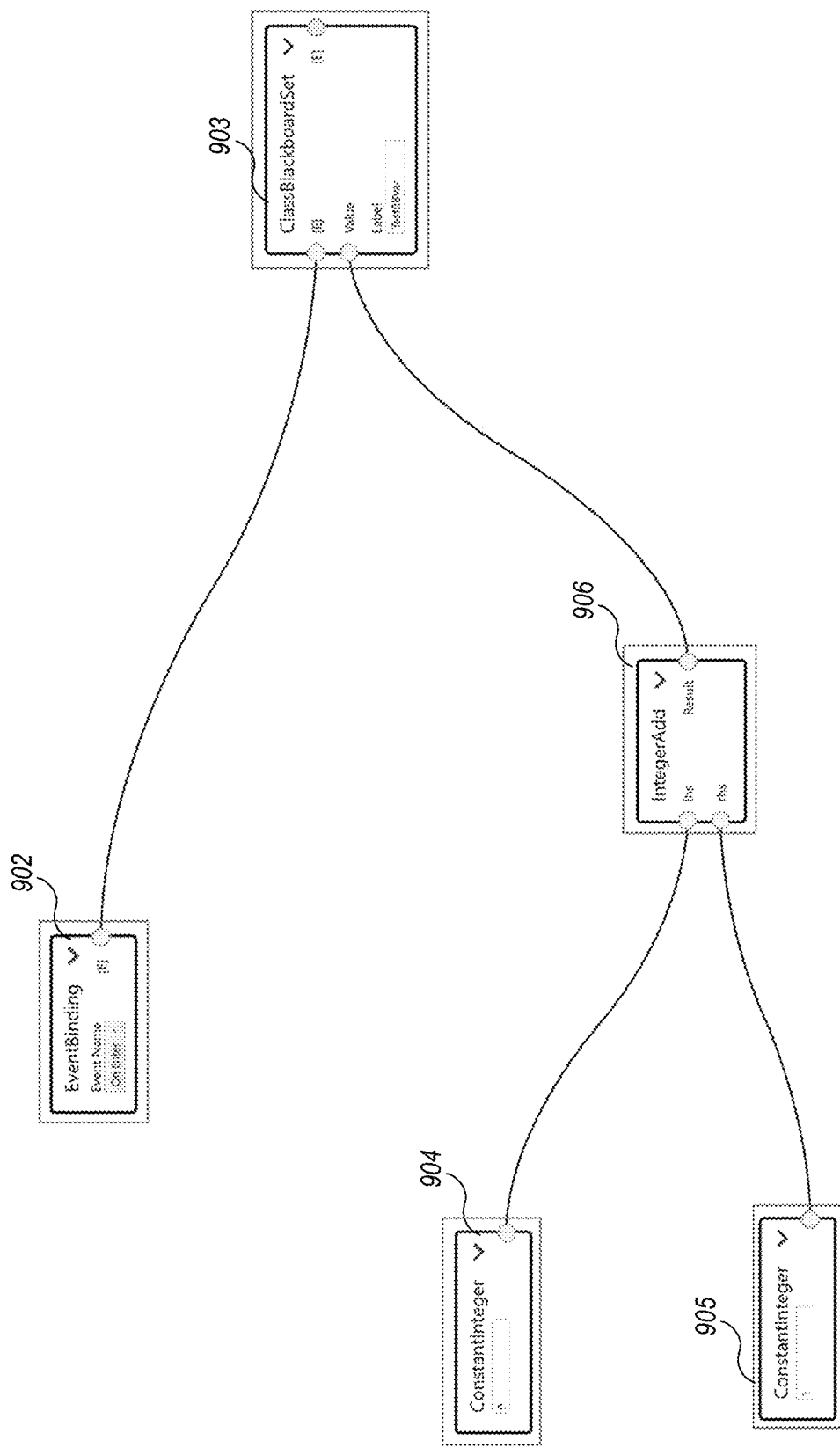
FIGS. 10A-10F show a sequence of applying a set of construction and layout rule logic to a node graph in an example Enhanced Game Play Interactive Development Environment.

In FIG. 10A, the EGPIDE autolayout logic starts with placing leaf AABBs around each node according to rule #1. The gray boxes around nodes 902-906 illustrate these bounding boxes.

Figure 10B:
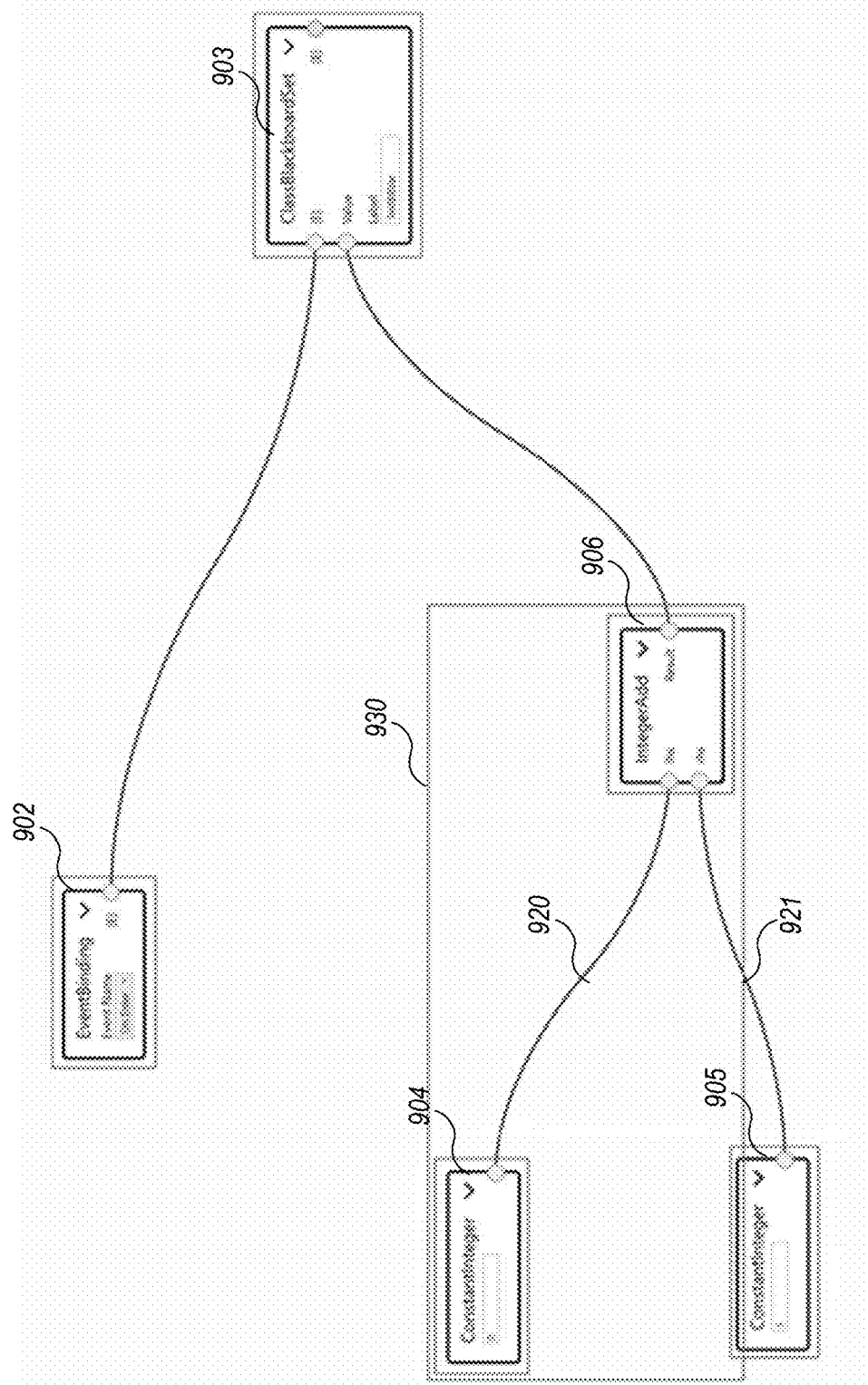

In FIG. 10B, the logic starts with ConstantInteger node with value 0 (node 904) as our starting leaf node. It examines the evaluation link 920 and creates an AABB evaluation unit 930 around the ConstantInteger node 904 and IntegerAdd node 906 according to AABB Construction Rule #2.b.i. Note that the alignment aspects with the AABB are applied after the AABBs are constructed.

Figure 10C:
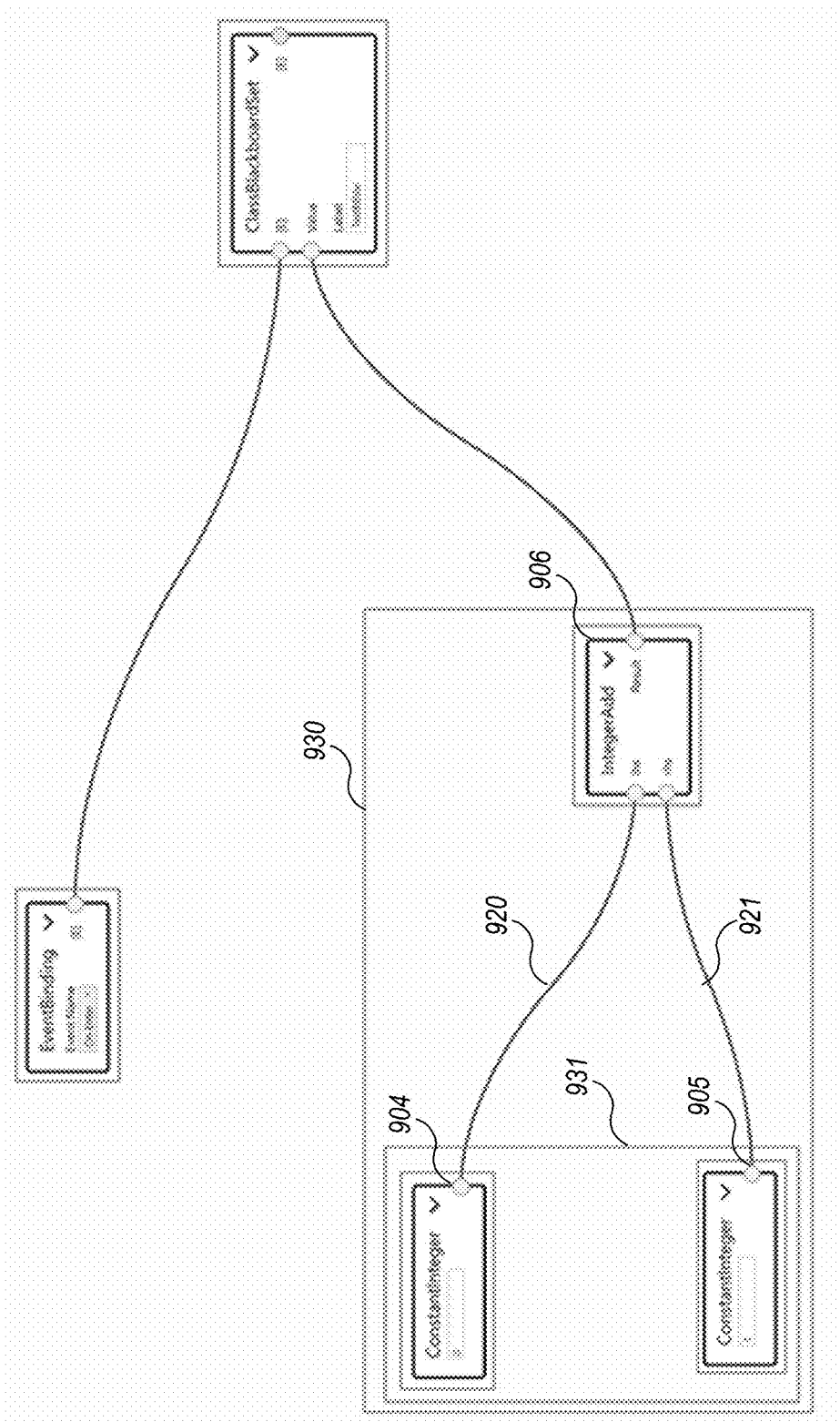

In FIG. 10C, the logic inserts the ConstantInteger node with value 1 (node 905) into the existing evaluation unit AABB 930 according to the AABB Construction Rule #2.b.ii. and creates bounding box 931.

Figure 10D:
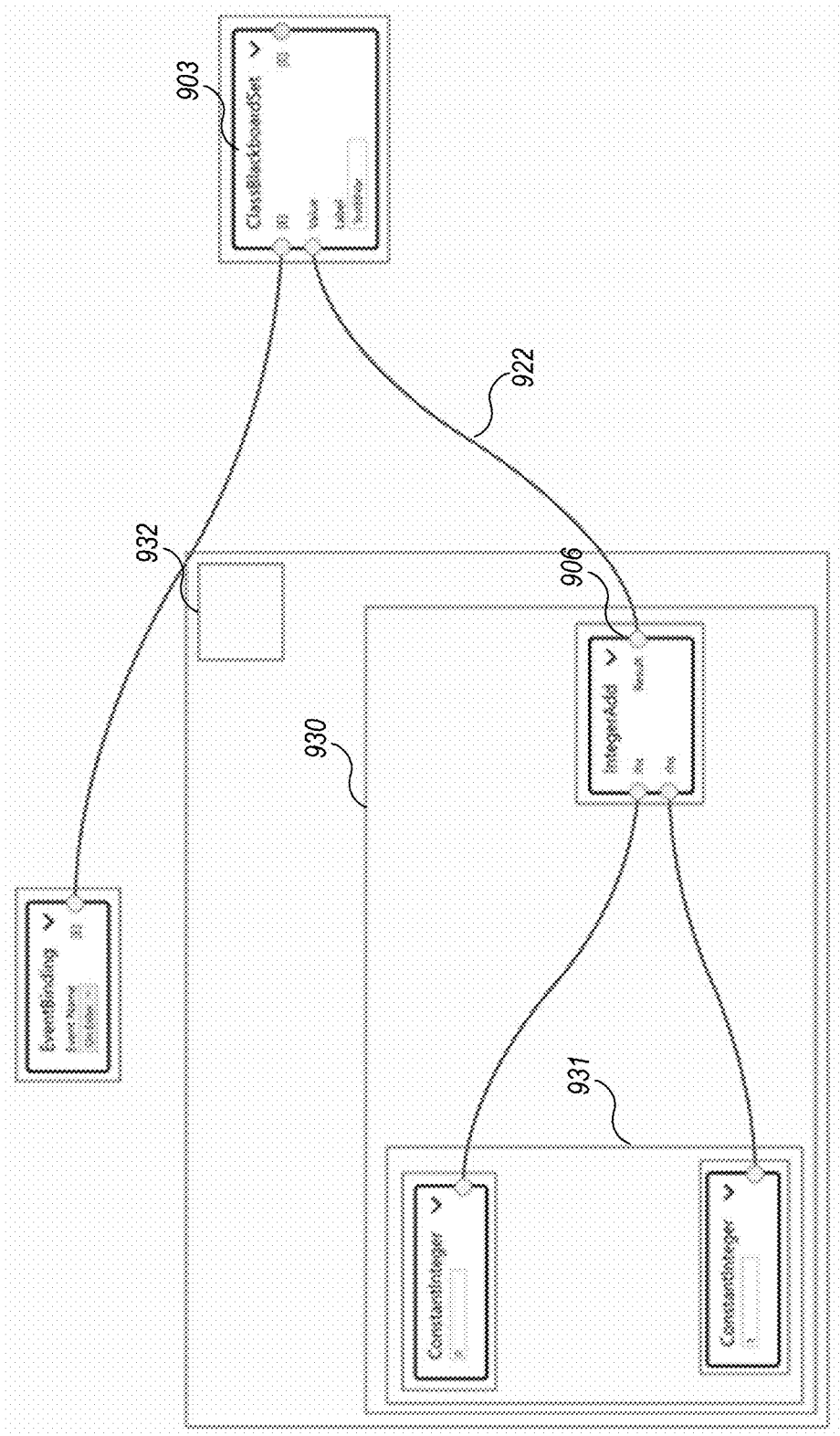

In FIG. 10D, the logic examines the evaluation link 922 between the IntegerAdd node 906 and the ClassBlackboardSet node 903. Since ClassBlackboardSet node 903 is an execution node, we add an indentation AABB 932 as per Rule #2.b.ii.1

Figure 10E:
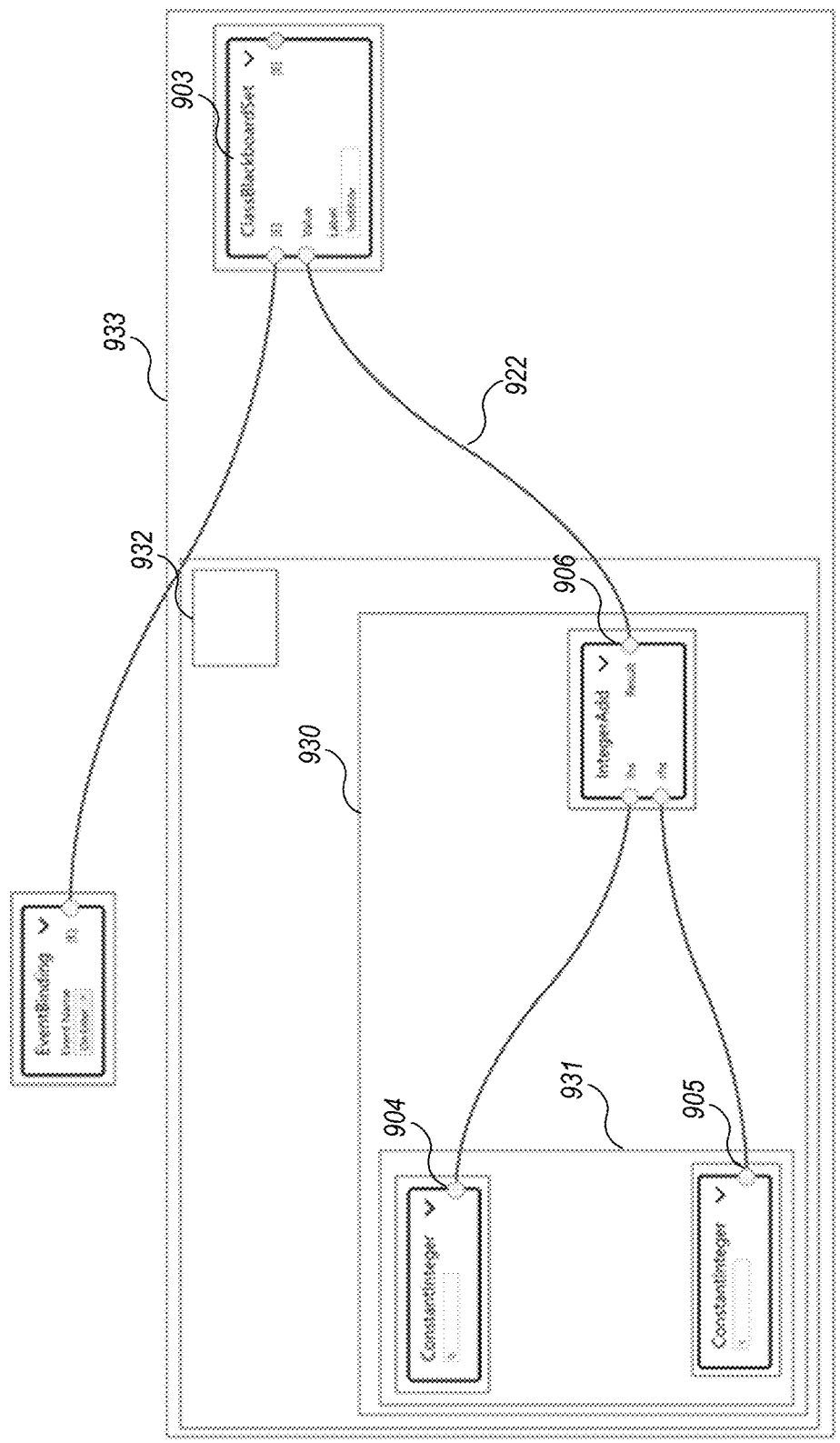

In FIG. 10E, the logic constructs another evaluation unit AABB 933 as per Rule #2.b.i.

Figure 10F:
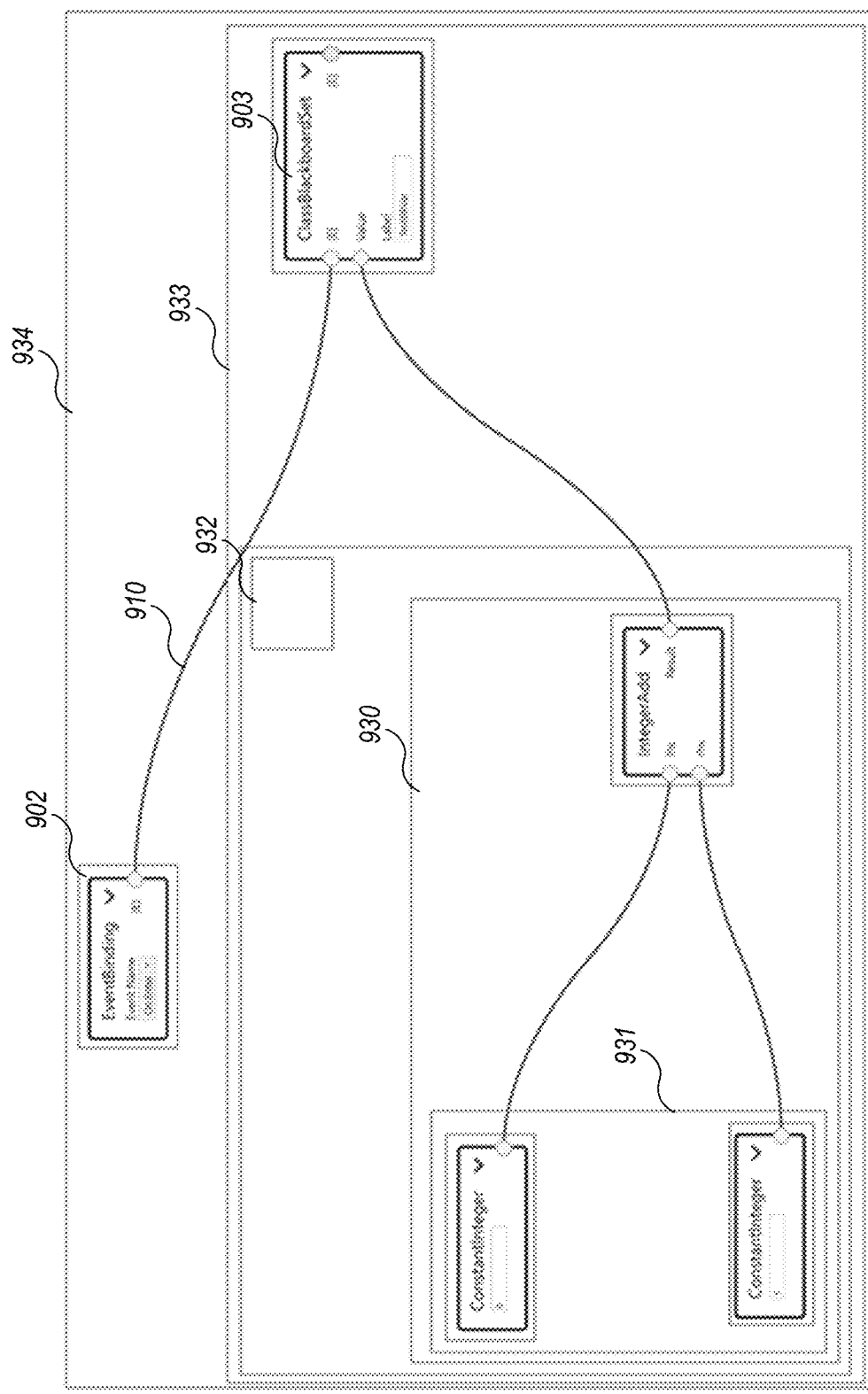

In FIG. 10F, the logic wraps the EventBinding node 902 and ClassBlackboardSet node 903 based on rule #3 (into a new AABB 934) because link 910 is an execution link.

At this point all of the AABB boxes 930-934 are created and nested according to evaluation order. At this point, the EGPIDE applies repositioning and alignment in order to optimize the layout. FIGS. 11A-11F show a sequence of applying a set of repositioning and layout logic to the constructed auto-aligned bounded boxes created in FIGS. 10A-10F.

Figure 11A:
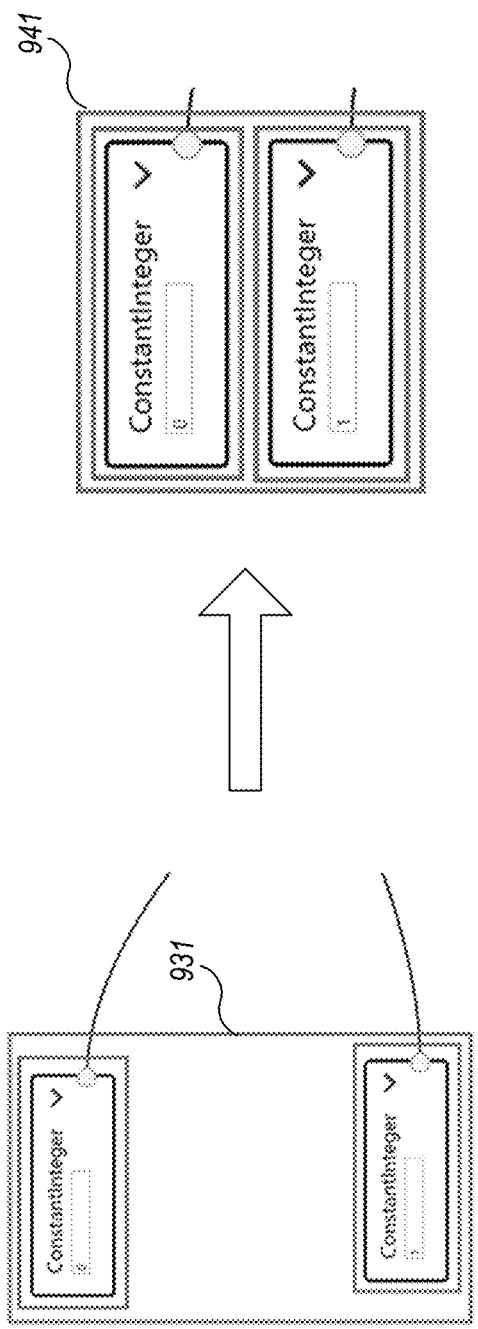
FIGS. 11A-11F show a sequence of applying a set of repositioning and layout logic to the constructed auto-aligned bounded boxes created in FIGS. 10A-10F.

In FIG. 11A, output siblings are repositioned to a right-aligned vertical branch AABB.

Figure 11B:
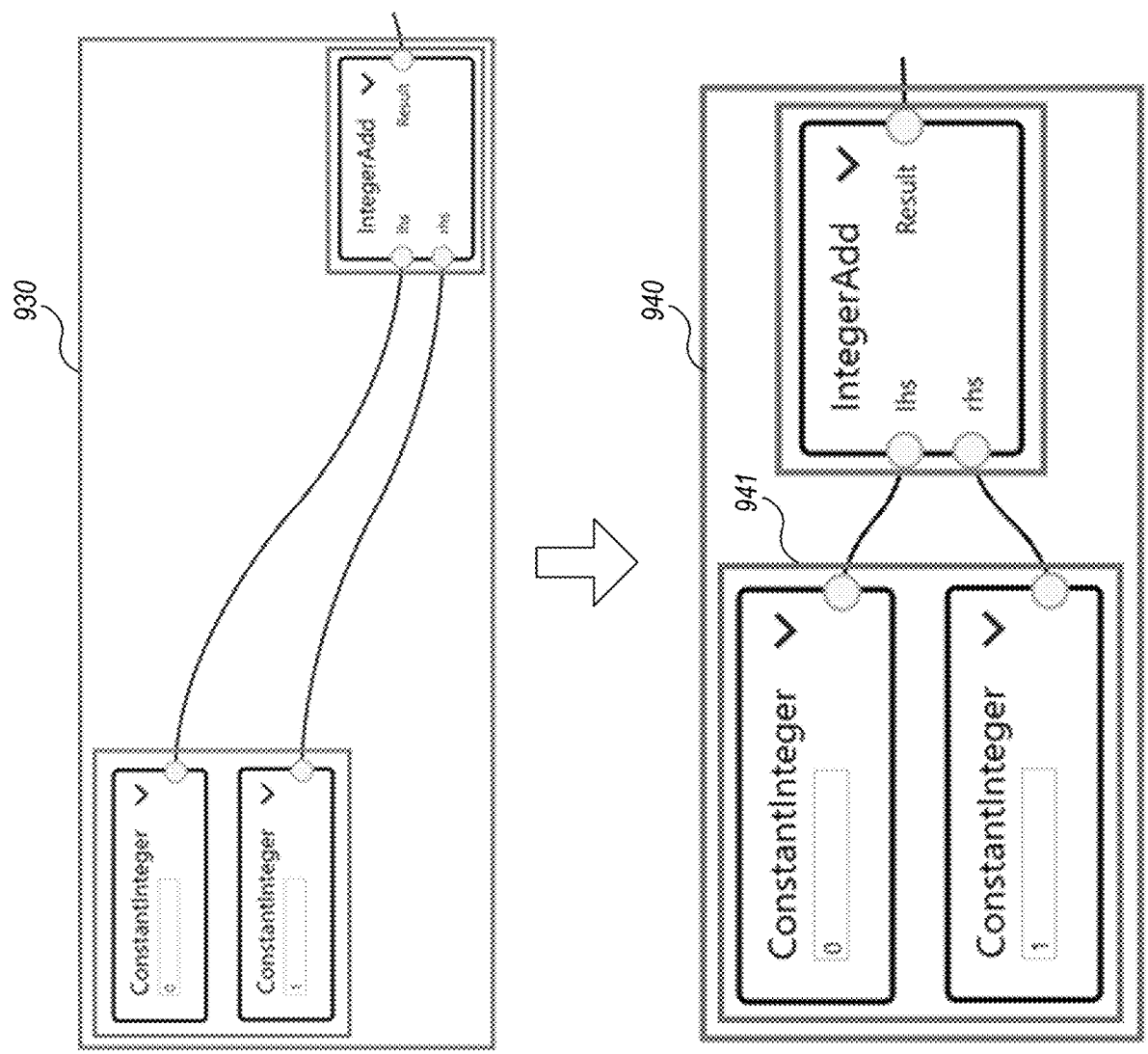
Figure 11C:
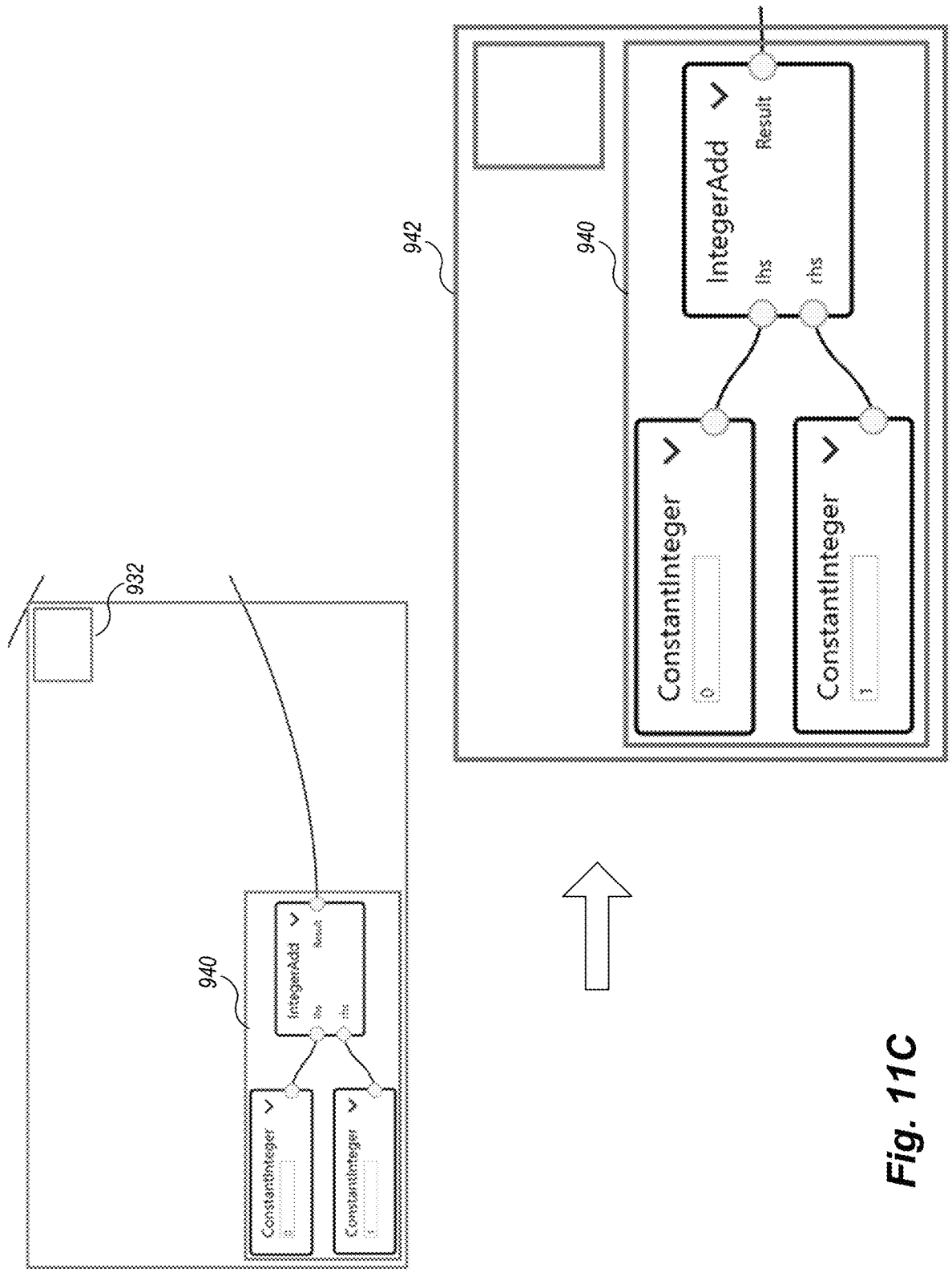

In FIG. 11B, the logic realigns the nodes in AABB 930 to create center-aligned horizontal evaluation unit AABB 940, containing AABB 941.

In FIG. 11O, the logic repositions right aligned vertical output sibling AABB 940 to align with AABB 932, creating aligned AABB 942.

Figure 11D:
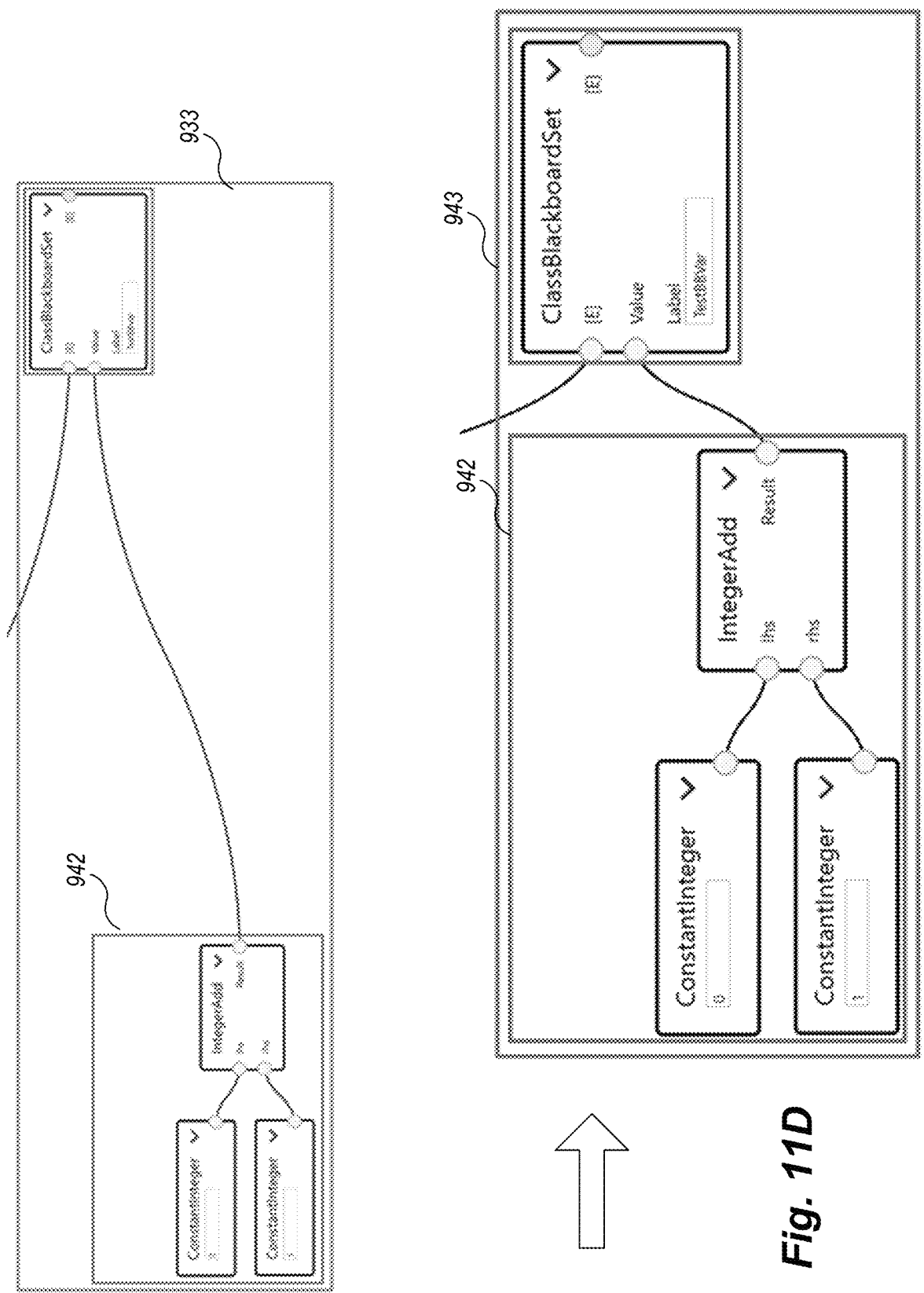

In FIG. 11D, the logic repositions the nodes in AABB 933 to create top-aligned horizontal evaluation unit AABB 943.

Figure 11E:
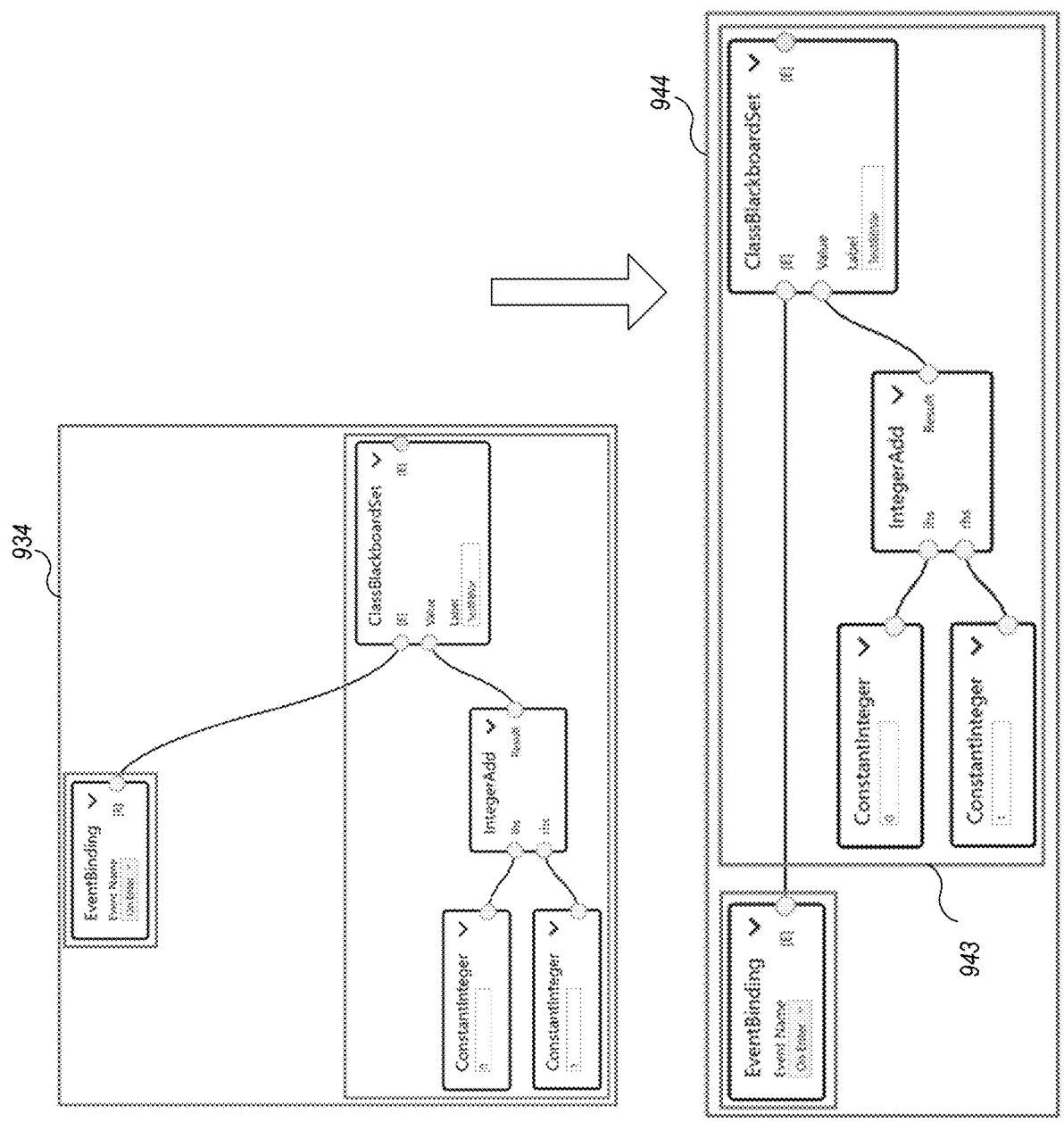
Figure 11F:
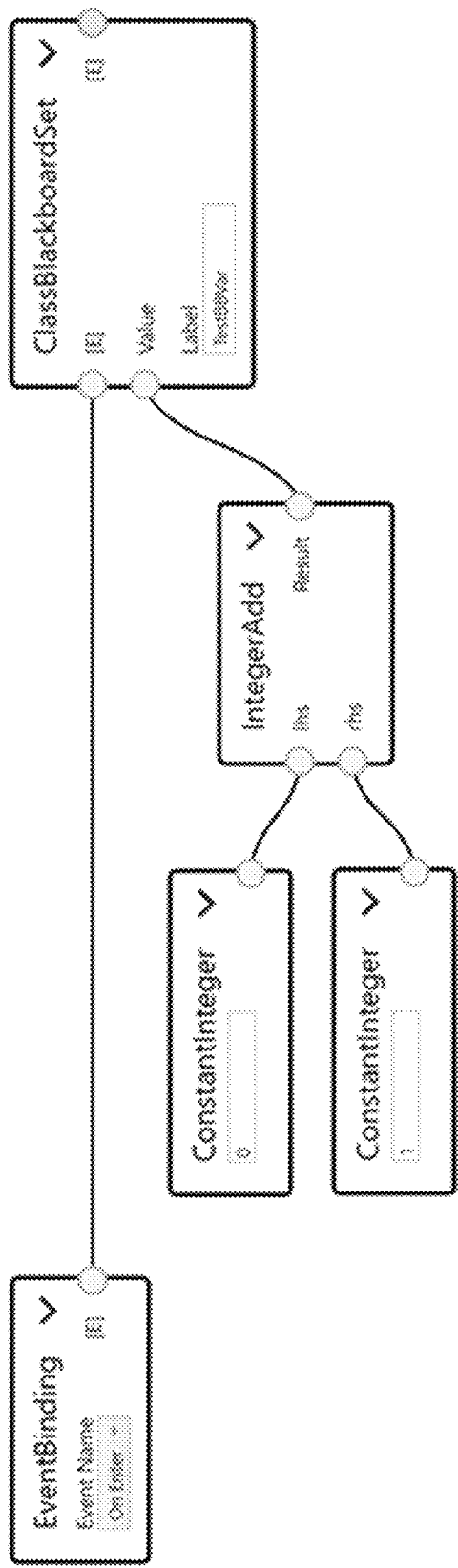

In FIG. 11E, the logic repositions the nodes in AABB 934 to create a top-aligned horizontal execution chain AABB 944. The final result is shown in FIG. 11F. This is the result placed in the node graph display area.

The logic for autolayout of a node graph becomes particularly important when multiple node graphs are displayed to avoid any overlap between the node graphs. This permits the game designer to simply transfer the script text from the software programmer without worrying about exactly where it is put in the node graph display area.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 63/297,206, entitled "IMPROVED WORKFLOW FOR COMPUTER GAME DEVELOPMENT," filed Jan. 6, 2022, is incorporated herein by reference, in its entirety.

From the foregoing it will be appreciated that, although specific embodiments have been described herein for purposes of illustration, various modifications may be made without deviating from the spirit and scope of the invention. For example, the methods and systems for performing automated translation and layout discussed herein are applicable to other architectures other than a .net or Windows architecture. Also, the system, methods and techniques discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A computing system for facilitating computer game development work flow to enhance collaboration between a software programmer and a non-programmer game developer (NPGD), comprising:
a processor;
a memory; and
interactive software development environment code logic, stored in the memory and configured, when executed by the processor, to provide a visual programming user interface for software game development, the user interface displaying one or more visual programming tools manipulatable by the non-programmer game developer to create and define one or more node graphs without programming in a programming language and without programming in a scripting language, each node graph corresponding to a game object and associated game logic that is executable to produce game behavior, each node graph presenting one or more nodes that define states, attributes, and/or actions of the game object responsive to one or more events;
wherein the interactive software development environment is further configured, in response to receiving an indication of one or more nodes, to automatically generate corresponding executable code in at least one programming language or script language, the executable code, when executed by the processor, generating and presenting one or more corresponding game objects and game logic corresponding to the states, attributes and/or actions of the game objects corresponding to the indicated one or more nodes, the interactive software development environment structured such that the software programmer directly views and manipulates the generated code without use of the visual programming user interface; and
wherein the interactive software development environment is further configured, in response to receiving a modification to the corresponding executable code, causing the presented node graphs to be automatically updated graphically to present modified node graphs in accordance with the received executable code modification.

2. The system of claim 1 wherein the interactive software development environment is further configured to automatically arrange and layout each node graph to avoid collisions and based upon execution flow of each node graph.

3. The system of claim 2 wherein the automatic arrangement and layout is determined by traversing each node in each node graph to determine an optimal placement.

4. The system of claim 1 wherein each node graph is an abstract syntax tree of the corresponding game object and the states, attributes, and/or actions that correspond to the corresponding game object.

5. The system of claim 1 wherein each node graph includes one or more nodes, one node corresponding to an instantiated game object and one or more nodes, each node corresponding to an event, a state change, and/or an attribute.

6. The system of claim 1 wherein the user interface, responsive to direct manipulation actions by the non-programmer game developer, connects nodes to indicate game state change and/or game flow.

7. The system of claim 1 wherein the user interface, responsive to receiving input in a user interface control presented as part of a node, defines the states, attributes and/or actions of the corresponding game object.

8. The system of claim 1, the user interface displaying a separate node graph presentation window configured to present the one or more node graphs and a separate message communication window, the user interface further configured to automatically generate and present corresponding executable code responsive to detecting that one or more visual node graphs have been dragged to the message window.

9. The system of claim 1, the user interface displaying a separate node graph presentation window configured to present the one or more node graphs and a separate message communication window configured to present text, the user interface further configured to automatically generate and present the corresponding node graphs responsive to detecting that executable code from the message communication window has been dragged to the message window.

10. A method in a computing system for implementing a user interface structured to facilitate computer game development workflow between a software programmer and a non-programmer game developer, comprising:
under control of the computing system,
presenting in a first display area a visual programming user interface having one or more visual programming tools manipulatable by the non-programmer game developer to create and define one or more node graphs without programming in a programming language and without programming in a scripting language, each node graph corresponding to a game object and associated game logic that is executable to produce game behavior, each node graph presenting one or more nodes that define states, attributes, and/or actions of the game object responsive to one or more events;
presenting in a separate and distinct second display area a computer code area configured to display programming language or programming script code executable by a gaming computer system to display game objects and present game flow;
wherein, responsive to receiving an indication in the first display area that a executable code has been received in the first display area, automatically translating the executable code to a corresponding node graph and presenting the corresponding node graph in the first display area; and wherein, responsive to receiving an indication in the second display area that a node graph has been received in the second display area, automatically translating the received node graph to corresponding executable code in a programming language or programming script, and presenting the corresponding executable code in the second display area.

11. The method of claim 10, further comprising:
responsive to receiving modification of executable code presented in the second display area, automatically updating the first display area to present a node graph corresponding to the modified executable code.

12. The method of claim 10, further comprising:
receiving indication through a direct manipulation interface, indications of one or more nodes in a node graph and corresponding node definitions using the visual programming tools, the nodes arranged by the non-programmer game developer to indicate game flow, game state, and/or game attributes; and
responsive to the indicated one or more nodes and corresponding node definitions, automatically arranging and presenting the one or more nodes in a node graph to avoid collisions and based upon execution flow of the one or more nodes in the node graph.

13. The method of claim 12 wherein automatically arranging is determined by traversing each node in each node graph to determine an optimal placement.

14. The method of claim 12, further comprising:
presenting each node in the first display area with one or more pin connectors, and wherein the direct manipulation interface is configured to allow the non-programmer game developer to connect two nodes through a respective pin of each of the two nodes.

15. The method of claim 10 wherein the node graph is an abstract syntax tree of a corresponding game object.

16. The method of claim 10 wherein, responsive to receiving input from the non-programmer game developer in a text or selection control field of a user interface control associated with a presented node in a node graph, setting a state, attribute, or action of the presented node.

17. A non-transitory storage medium storing computer instructions that, when executed, control a computer processor to present an interactive software development environment for facilitating workflow between a software programmer and a non-programmer game developer by performing a method comprising:
presenting in a first display area a visual programming user interface having one or more visual programming tools manipulatable by the non-programmer game developer to create and define one or more node graphs without programming in a programming language and without programming in a scripting language, each node graph corresponding to a game object and associated game logic that is executable to produce game behavior, each node graph presenting one or more nodes that define states, attributes, and/or actions of the game object responsive to one or more events;

presenting in a separate and distinct second display area a computer code area configured to display programming language or programming script code executable by a gaming computer system to display game objects and present game flow;

wherein, responsive to receiving an indication in the first display area that a executable code has been received in the first display area, automatically translating the executable code to a corresponding node graph and presenting the corresponding node graph in the first display area; and wherein, responsive to receiving an indication in the second display area that a node graph has been received in the second display area, automatically translating the received node graph to corresponding executable code in a programming language or programming script, and presenting the corresponding executable code in the second display area.

18. The computer-readable storage medium of claim 17 wherein the method further comprises:
responsive to receiving modification of executable code presented in the second display area, automatically updating the first display area to present a node graph corresponding to the modified executable code.

19. The computer-readable storage medium of claim 17, wherein the method further comprises:
receiving indication through a direct manipulation interface, indications of one or more nodes in a node graph and corresponding node definitions using the visual programming tools, the nodes arranged by the non-programmer game developer to indicate game flow, game state, and/or game attributes; and
responsive to the indicated one or more nodes and corresponding node definitions, automatically arranging and presenting the one or more nodes in a node graph to avoid collisions and based upon execution flow of the one or more nodes in the node graph.

20. The computer-readable storage medium of claim 17, wherein the method further comprises:
presenting each node in the first display area with one or more pin connectors and wherein the direct manipulation interface is configured to allow the non-programmer game developer to connect two nodes through a respective pin of each of the two nodes.

* * * * *